(12) United States Patent
Uner

(10) Patent No.: US 6,987,853 B2
(45) Date of Patent: Jan. 17, 2006

(54) METHOD AND APPARATUS FOR GENERATING A GROUP OF CHARACTER SETS THAT ARE BOTH NEVER REPEATING WITHIN CERTAIN PERIOD OF TIME AND DIFFICULT TO GUESS

(75) Inventor: Eric R. Uner, Carpentersville, IL (US)

(73) Assignee: Bodacion Technologies, LLC, Barrington, IL (US)

( * ) Notice: Subject to any disclaimer, the term of this patent is extended or adjusted under 35 U.S.C. 154(b) by 497 days.

(21) Appl. No.: 09/725,786

(22) Filed: Nov. 29, 2000

(65) Prior Publication Data

US 2002/0064279 A1    May 30, 2002

(51) Int. Cl.
*H04L 9/00*    (2006.01)
(52) U.S. Cl. .......................................... 380/44; 380/46
(58) Field of Classification Search ............ 380/43–47, 380/277–278; 713/168–171, 189; 708/250, 708/254, 255, 270
See application file for complete search history.

(56) References Cited

U.S. PATENT DOCUMENTS

| | | | |
|---|---|---|---|
| 4,255,811 A | | 3/1981 | Adler |
| 5,349,642 A | | 9/1994 | Kingdon |
| 5,383,134 A | * | 1/1995 | Wrzesinski ............ 340/870.03 |
| 5,633,931 A | | 5/1997 | Wright |
| 5,740,243 A | * | 4/1998 | Rehm ............................ 380/1 |
| 5,892,827 A | | 4/1999 | Beach et al. |
| 5,913,217 A | | 6/1999 | Alger et al. |
| 5,915,021 A | | 6/1999 | Herlin et al. |
| 5,963,646 A | | 10/1999 | Fiedler et al. |
| 5,982,892 A | | 11/1999 | Hicks et al. |
| 6,064,989 A | | 5/2000 | Cordery et al. |
| 6,075,860 A | | 6/2000 | Ketcham |
| 6,076,097 A | | 6/2000 | London et al. |
| 6,084,877 A | | 7/2000 | Egbert et al. |
| 6,085,323 A | | 7/2000 | Shimizu et al. |
| 6,104,810 A | | 8/2000 | DeBellis et al. |
| 6,640,301 B1 | * | 10/2003 | Ng ............................ 713/156 |

* cited by examiner

*Primary Examiner*—Hosuk Song
(74) *Attorney, Agent, or Firm*—Meroni & Meroni, P.C.; Charles F. Meroni, Jr.; Christopher J. Scott

(57) ABSTRACT

A method and apparatus for generating a group of non-repetitive, difficult-to-guess character sets is disclosed. The method includes (a) generating a request for a character set by a client of a character-generating server, (b) sending the request to the character-generating server, (c) generating a pseudo random number required by the character generator; (d) sending the pseudo random number to the character generator; (e) generating a character for the character set by the character generator, (f) sending the character set along with a related key to the client; (g) sending the character set along with the related key to a target server, (h) sending related key to the character-generating server by the target server; (i) re-creating the character set from the related key by the target server; and (j) sending the character set along with the related key to the target server.

158 Claims, 6 Drawing Sheets

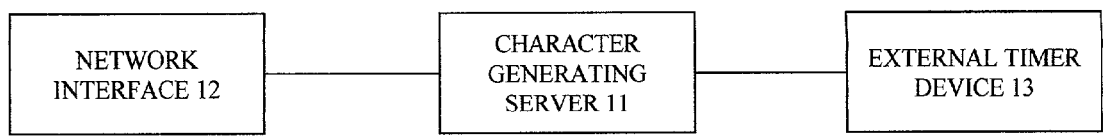
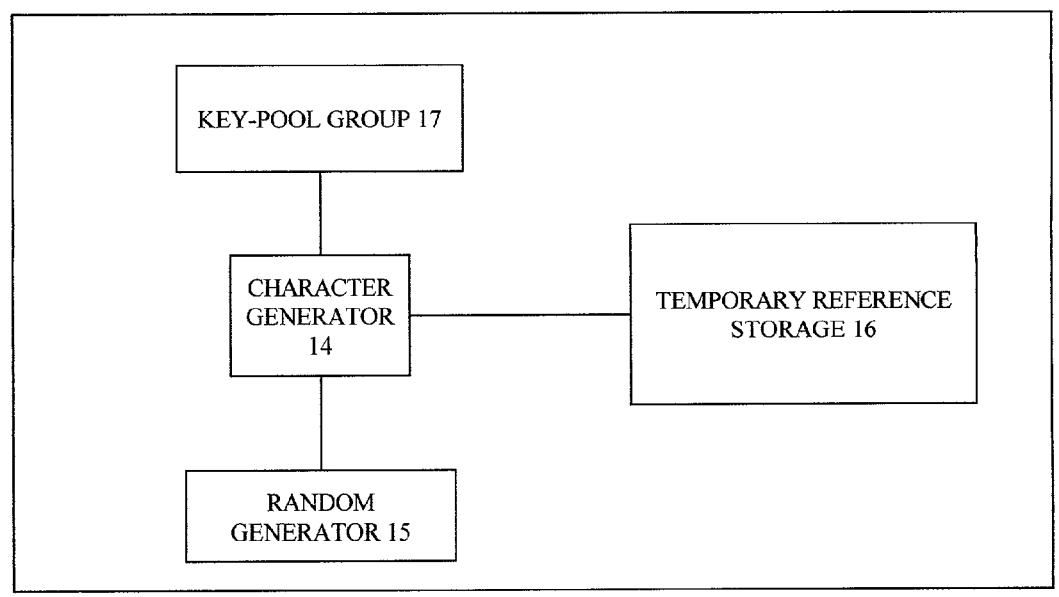
Fig. 1
Fig. 2

Fig. 4

| Char | ASCII | Char | ASCII | Char | ASCII | Char | ASCII |
|------|-------|------|-------|------|-------|------|-------|
| 2 | 0x32 | 3 | 0x33 | 4 | 0x34 | 5 | 0x35 |
| 6 | 0x36 | 7 | 0x37 | 8 | 0x38 | 9 | 0x39 |
| A | 0x41 | B | 0x42 | C | 0x43 | D | 0x44 |
| E | 0x45 | F | 0x46 | G | 0x47 | H | 0x48 |
| J | 0x4a | K | 0x4b | L | 0x4c | M | 0x4d |
| N | 0x4e | P | 0x50 | Q | 0x51 | R | 0x52 |
| S | 0x53 | T | 0x54 | U | 0x55 | V | 0x56 |
| W | 0x57 | X | 0x58 | Y | 0x59 | Z | 0x5a |

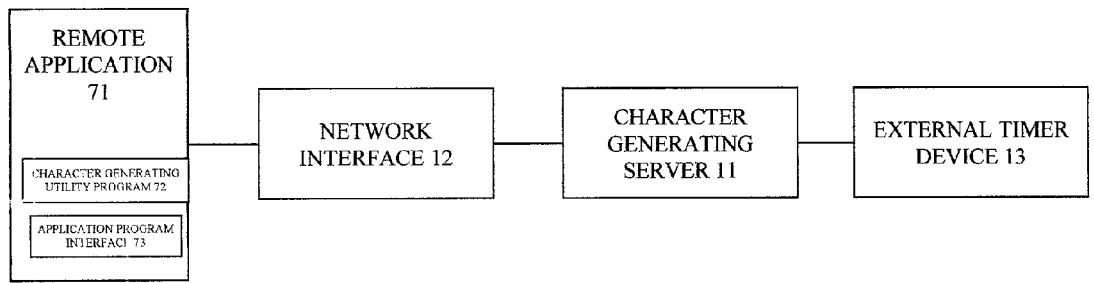
Fig. 7
Fig. 8
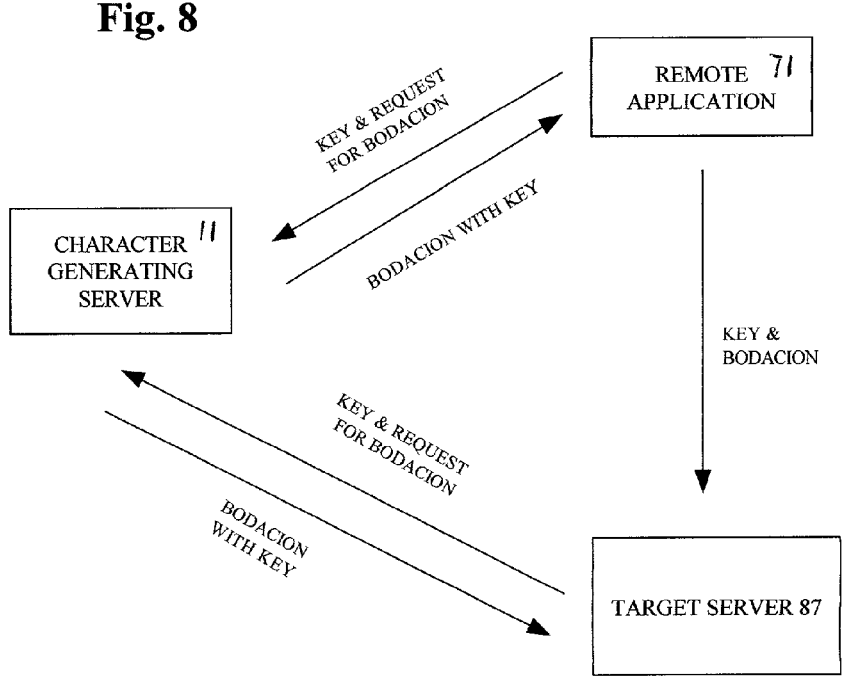

METHOD AND APPARATUS FOR GENERATING A GROUP OF CHARACTER SETS THAT ARE BOTH NEVER REPEATING WITHIN CERTAIN PERIOD OF TIME AND DIFFICULT TO GUESS

BACKGROUND OF THE INVENTION

1. Field of the Invention

The present invention relates to data generating method and apparatus. More specifically, my invention is primarily intended for generating random character sets which are both never repeating within certain period of time and difficult to guess.

2. Description of the Prior Art

Computers and the Internet have become a most significant part of modern communication. Remote access to data has become the essence of the Internet. In order to restrict access to data to authorized users and authorized users only, a lot of securities measure have been put into place. One of the most commonly used methods to secure data is to add a key to the data. The key performs two functions. One is to limit access to data to certain authorized users; the other is to keep track of the access to data by authorized users.

Various inventions have been made to generate these keys. U.S. Pat. No. 4,255,811, which issued to Adler, discloses a Key Controlled Block Cipher Cryptographic System. This invention provides a cryptographic system for encrypting a block of binary data under the control of a key consisting of a set of binary symbols. The cryptographic system may be utilized within a data processing environment to ensure complete privacy of data and information that is stored or processed within a computing system. All authorized subscribers who are permitted access to data within the network are assigned a unique key consisting of a combination of binary symbols. The central processing unit within the computing network contains a complete listing of all distributed authorized subscriber keys. All communications transmitted from terminal input are encrypted into a block cipher by use of the cryptographic system operating under the control of the subscriber key which is inputted to the terminal device. At the receiving station or central processing unit, an identical subscriber key which is obtained from internal tables stored within the computing system is used to decipher all received ciphered communications. It is a primary object of this invention to provide a cryptographic method and apparatus capable of maintaining a high degree of secrecy during the transmission or storage of binary data. It is a further object of the invention to provide such a cryptographic method and apparatus particularly suitable for use in information handling systems such as an electronic digital computer. It is a still further object of the invention to provide such a cryptographic method and apparatus which produces enciphered binary data blocks into a cipher text that is not susceptible to breaking by known cryptanalysis methods. It is another object of the invention to provide such a method and apparatus that operates on a block of data by developing a product cipher dependent upon a unique key which is known only to authorized users and to the system. It is a still further object of this invention to provide such a method and apparatus capable of enciphering a clear text message by means of a product cipher of successive blocks of said message, each product cipher comprising a plurality of linear and affined transformations which are a function of a unique subscriber key configuration, wherein each transformation utilizes a key input which is itself a subset or function of said key and further including a unique nonlinear transformation comprising addition-with-carry of a partially enciphered or deciphered block of data under control of said subscriber key. It is a further object of this invention to provide such a cryptographic system capable of maintaining privacy between any transmitting and receiving station in a communications network or between a plurality of terminals and a central processor including data banks of a computer system. It is yet another object of the invention to provide such a method and apparatus which may be utilized for both encryption and decryption with very slight modification.

U.S. Pat. No. 5,349,642, which issued to Kingdon, discloses a Method and Apparatus for Authentication of Client Server Communication. This invention provides a method and apparatus for message packet authentication to prevent the forging of message packets. After a message packet is created, a secret session key is preappended to the message, and a message digesting algorithm is executed on the altered message to create a message digest. A portion of the message digest, referred to as the signature, is then appended to the actual message when it is sent over the wire. The receiving station strips the signature from the message, preappends the same secret session key and creates its own message digest. The signature of the digest created by the receiving station is compared to the signature of the digest appended by the sending station. If there is a match, an authentic message is assumed. If there is no match, the message is considered as invalid and discarded. An advantage of this invention is that the session key is never transmitted over the wire. The receiving station (server) already has the key and uses the key along with the message data to recalculate the message digest upon receiving the packet. The shared secret key (session key) is generated during initiation of the NCP session. In addition, cumulative state information is maintained by both the sending station and the receiving station. This state information is also used to authenticate messages.

U.S. Pat. No. 5,633,931, which issued to Wright, discloses a Method and Apparatus for Calculating Message Signatures in Advance. This invention provides a method and apparatus for authenticating a message transmitted from a sender to a receiver, where the message is a response to a prior communication from the receiver to the sender, comprising the following steps. First, the sender generates a message signature at least partially derived from a message and a code held by both the sender and receiver. Second, the sender creates an appended message by combining the message signature to the message. Third, the sender sends the appended message to the receiver. Fourth, prior to receiving the message signature and message from the sender, the receiver generates a predicted message signature that is at least partially derived from an expected message from the sender to the receiver and a code held by both the sender and receiver. Fifth, the receiver receives the appended message transmitted by the sender. Sixth, the receiver compares the predicted message signature with the received message signature. Lastly, the receiver authenticates the message it received if the predicted message signature and the received message signature match. An object of this invention is to provide an improved means for preventing message packet forgery. Another object of this invention is to provide an improved message packet authentication means for preventing message packet forgery. Yet another object of this invention is to provide an improved message packet authentication means for preventing message packet forgery that reduces message authentication time. A further object of this invention is to provide an improved message packet authentication means for preventing message packet forgery that reduces overall message transaction time.

U.S. Pat. No. 5,892,827, which issued to Beach, discloses a Method and Apparatus for Generating Personal Identification Numbers for Use in Consumer Transactions. This invention resides in a method for assuring security of individually identifiable randomly numbered certificates is accomplished by printing an encoded self-validating PIN on each certificate. An encryption method permits the PIN to be deciphered when it is presented for redemption. The method enables a greater number of potential personal identification numbers, in the form of PINs, to be generated from a limited or fixed number of digits. The method includes the printing of an authorization code on the certificate, which code will subsequently be used to verify the validity of the award. Preferably, the method includes the generation, in real time at the point-of-sale in a retail store, of seemingly random authorization codes which will be subsequently used to verify the validity of the award as well as to provide information pertaining to the location of the printing of the authorization code on the certificate, which will also be subsequently used to verify the validity of the award. Briefly, and in general terns, the method of the invention comprises the steps of detecting the occurrence of an event that has been preselected to trigger the generation of a certificate of value for distribution to a customer of a retail store; generating a certificate of value in response to the detecting step; generating a unique and seemingly random authorization code at about the same time that the certificate is generated; and including the authorization code in the certificate. The certificate is self-validating and has no existence or value prior to its generation and there is, therefore, no requirement to keep an inventory of either certificates or authorization codes before their generation.

U.S. Pat. No. 5,913,217, which issued to Alger, discloses a Generating and Compressing Universally Unique Identifiers (UUIDS) Using Counter Having High-Order Bit to Low-Order Bit. This invention provides a computer-based method and system that reduces the overhead of storing object identifiers and reduces the chance of duplicate object identifiers being generated. The system generates counter-based identifiers rather than OSF-defined identifiers. To generate an identifier, the system increments a counter having bits that are ordered from a high-order bit to a low-order bit. The system sets a computer system identifier portion of contiguous bits of the identifier to identify the computer system that is generating the identifier. The system also sets a counter portion of contiguous bits of the identifier to the bits of the incremented counter. The system sets the bits of counter portion so that the bits of the counter portion that are closer to the bits of the computer system identifier portion are set to the higher-order bits of the counter. The counter-based object identifier has the advantage of being more efficiently compressed than the OSF-defined format. For example, since the high-order bits of the counter portion are closer to the node identifier portion, for object identifiers generated at the same computer system, the amount of contiguous information in two object identifiers that is redundant is increased. Compression techniques can reduce storage overhead by efficiently storing the redundant information. The system compresses a list of universally unique identifiers (UUIDs) by compactly representing redundant portions of the UUIDs. The system determines which portion of a selected UUID is redundant with a portion of a previously selected UUID. The system compresses a UUID by storing an indication of the portion of the selected UUID that is redundant and storing a remainder of the selected UUID that is not indicated as being redundant. When the redundant portions are contiguous and form either the prefix or the suffix of the UUIDs, one of many well known prefix or suffix compression algorithms can be used. In another aspect of this invention, the system compresses an object identifier by replacing a portion of the identifier with a short handle that specifies the bit that it replaces. The system generates a mapping of handles to values of a portion of object identifiers. To compress an object identifier, the system determines whether the value corresponding to the portion of the object identifier is in the generated mapping. When the value corresponding to the portion of the object identifier is in the generated mapping, the system sets a compressed form of the object identifier to a combination of the handle that maps to that value and of the remainder of the object identifier other than the value. To decompress a compressed object identifier, the system uses the handle to retrieve the bits for the portion from the mapping and adds the remainder.

U.S. Pat. No. 5,915,021, which issued to Herlin, discloses a Method for Secure Communications in a Telecommunications System. This invention provides a method for sending a secure message in a telecommunications system utilizing public encryption keys. All authentication parameters of each of the users, including each user's decryption key that is known only to the user, are used to verify, by public key methods, the identity of a user sending a communication to another user of the system. During the authentication process, an encryption key for use in communications between the two users may also be generated. The generated encryption key may be a private session key. Once the initial authentication is completed, the private session key can be used to perform encryption that is less computationally demanding than public key methods. In an embodiment of the invention, two communicating users may use the method to authenticate each other and generate an encryption key that is used to encrypt subsequent communications between the users. During the process of this embodiment, two encryption keys are generated. A first encryption key is used only in the authentication process, and, a second encryption key is used in both the authentication process and as the key for encrypting subsequent communications. Use of two encryption keys requires that each of the two users apply its decryption key to complete the authentication and encryption key agreement process successfully.

U.S. Pat. No. 5,963,646, which issued to Fielder, discloses a Secure Deterministic Encryption Key Generator System and Method. A method and system is disclosed for generating a deterministic but non-predictable symmetric encryption key which is highly resistant to cryptographic analysis or brute force attacks to discover the E-Key Seed of the encryption key generator. More particularly, the bits of a constant value or message are logically, cryptographically and/or algebraically combined with the bits of a secret plural bit sequence (E-Key Seed) to provide a bit-shuffling which results in the mapping of a large number of bits into a first pseudo-random number having fewer bits. The resulting bit sequence then is applied through a secure hash function for increased irreversibility. The message digest in turn may be truncated to a desired bit length to provide a repeatable, non-predictable but deterministic, and pseudo-random symmetric encryption key. In one aspect of the invention, the encryption key produced by the encryption key generator may be reproduced by applying same inputs to the generator. The need for key directories or key records thereby is obviated. In another aspect of the invention, attempts to discover the E-Key Seed of the encryption key generator through cryptographic analysis or brute force attacks is thwarted by having one input, the secret E-Key Seed, held in secret and consisting of a plural bit sequence of at least 224 bits, by algebraically combining the bits of the E-Key Seed and the constant value to provide a many-to-few bit mapping result as a pseudo-random input to the secure hash algorithm, and by applying the combination through a secure hash function which enhances the irreversibility of the pseudo-random encryption key output. In still another aspect of the invention, the E-Key Seed and constant value may be combined through a sequence of logic, algebraic, and/or cryptographic steps to provide an input to the secure hash function. In a further aspect of the invention, the E-Key Seed and constant value may be encrypted to provide an input to the secure hash function.

U.S. Pat. No. 5,982,892, which issued to Hicks, discloses a System and Method for Remote Authorization for Unlocking Electronic Data. The main components of the system of this invention include a product key generator, a user key generator, and a user key verifier. The product key generator is responsible for generating a signing key or keys, and a verification key or keys. The user key generator generates a unique user key(s) using a numeric representation(s) of identifying information relating to a user; such identifying information optionally may include licensing information containing terms of permitted use and the signing key(s). The user key verifier determines whether the user key matches the identifying information as a means for controlling the use mode of the software. This use of digital signatures to generate user keys is both novel and nonobvious over the prior art. This invention also includes a method for controlling unauthorized use of software distributed by a software vendor. The method begins by generating a verification key with a product key generator. The verification key includes a private signing key and a public verification key. The software and the verification key are combined to create distributable software which is distributed to a user. The user installs the software on a user computer system as protected software. To obtain a user key, the user inputs user identifying information which is sent to a user key generator. The user identifying information may include licensing information as well as information on the user, the user's computer system, etc. The user key generator converts the user identifying information to a numeric representation and then generates, by signing the numeric representation with the private signing key, a user key. The user key is conveyed to the user computer system. Using the verification key, a user key verifier verifies a relationship between the user key and the user identifying information to determine an access level to the protected software. A general object of the invention is software that executes a user key verifier at run-time to determine run-state as a means of protecting the software from unauthorized use. Another object of the invention is a user key verifier that uses a public key signature verification algorithm to determine the validity of a user key. An additional object of the invention is the use of digital signatures to generate user keys in a system for controlling unauthorized use of software distributed to users. A further object of the invention is a system using the presence of a valid digital signature on licensing information to determine a program's mode of execution.

U.S. Pat. No. 6,064,989, which issued to Cordery, discloses a Synchronization of Cryptographic Keys between Two Modules of a Distributed System. The invention provides an apparatus for synchronizing cryptographic keys. The apparatus comprises: a first module including a universal key; a second module including a unique identifier and a unique key wherein the unique key is derived from the unique identifier and the universal key and incorporated into the second module during manufacture of the second module. The second module is in communication with the first module. The apparatus further comprises a controller for performing the following subsequent to manufacture of the first module and the second module: initiating a communication session between the first module and the second module; transmitting the unique identifier from the second module to the first module; and deriving the unique key in the first module using the unique identifier and the universal key. In accomplishing this and other objects there is provided a method for synchronizing cryptographic keys between a first module and a second module, the second module in communication with the first module, the method comprising the step(s) of: storing a universal key in the first module; storing a unique identifier in the second module; storing a unique key in the second module during manufacture of the second module wherein the unique key is derived from the unique identifier and the universal key; initiating a communication session between the first module and the second module subsequent to manufacture of the first module and the second module; transmitting the unique identifier from the second module to the first module; and deriving the unique key in the first module using the unique identifier and the universal key so that the unique key exists in both the first module and the second module. Additionally, there is provided a method of manufacturing a postage evidencing system including a meter, a printer and a control means for synchronizing cryptographic keys between the meter and the printer.

U.S. Pat. No. 6,075,860, which issued to Ketcham, discloses an Apparatus and Method for Authentication and Encryption of a Remote Terminal over a Wireless Link. This invention provides a method and system for authenticating an authorized user of a remote terminal attempting to interconnect with a computer network over a wireless modem. An encrypted wireless communication channel is established between a remote terminal and a network server for facilitating the authentication process. An authorized user presents an authentication card containing credentials including a user identifier and an authentication encryption key to a remote terminal. The remote terminal establishes a wireless communication channel with a network server which provides a firewall between unauthenticated users and a computer network. The network server and the remote terminal then exchange encrypted information thus verifying the authenticity of each party. The remote terminal and the network server each independently generate a data encryption key for use in establishing a secure encrypted wireless communication channel therebetween. It is an object of this invention to authenticate an authorized user of a remote terminal in a computer network prior to permitting access of that authorized user to the computer network. It is another object of this invention to establish a secure authenticated wireless communication channel between an authorized user of a remote terminal and a computer network. It is yet another object of this invention to provide a system for authenticating an authorized user of a computer network prior to permitting access of the authorized user to the computer network. It is another object of this invention to provide a system for establishing an encrypted authenticated wireless communication channel between a remote terminal and a computer network.

U.S. Pat. No. 6,076,097, which issued to London, discloses a System and Method for Generating Random Numbers. This invention provides a system and method for generating random data without using devices such as gas discharge tubes, leaky capacitors, noise generators or keyboard strokes, and without occupying UNIX timers and/or signals. In accordance with this invention, a loop count is selected and counted. Random data is taken from the least significant (the most active, and therefore the most random) bits of the value of the elapsed time over which the loop was counted. This is completely different from Truerand, which sets the duration for which the loop counts, and then derives random data from the number of times the loop is counted over that set duration. This invention realizes a more efficient and quicker way of generating data that is at least as random as that generated by Truerand. The unpredictability of both this invention and Truerand is based upon the UNIX scheduler and the granularity of the system clock. However, whereas Truerand generates between 25 and 30 bytes of random data per second on a Sun Sparc-20 workstation, this invention generates around 2000 bytes of random data per second on the same platform. Data generated in accordance with this invention has 10 passed chi-squared and compression tests for randomness. This invention advantageously use the standard UNIX system call gettimeofday to determine the elapsed time over which the loop is counted, while Truerand uses the ITIMER.sub.—REAL timer and SIGALRM signal. The use of the UNIX timer and signal precludes their use in the rest of the application in which Truerand occurs, disadvantageously preventing the programmer from easily and simply employing these useful UNIX features elsewhere in the application. This invention advantageously allows the programmer to use the UNIX timer and signal elsewhere in the application. This invention provides a fast, efficient way to generate data proven to be random by chi-squared and compression tests. It does not rely on UNIX timers and signals, allowing these to be used elsewhere in the application that requires random data.

U.S. Pat. No. 6,084,877, which issued to Egbert, discloses a Network Switch Port Configured for Generating an Index Key for a network Switch Routing Table Using a Programmable Hash Function. According to one aspect of this invention, a method for determining a network switch output port for transmission of a data packet having an address received by a network switch input port includes generating a hash key in the network switch input port for the data packet based on the corresponding address, and supplying the hash key generated in the network switch input port to a rules checker configured for determining the output port in response to the supplied hash key. Generation of the hash key in the network switch input port eliminates the necessity in a rules checker of simultaneously generating hash keys for data packets received from multiple switch ports simultaneously. Moreover, the generation of the hash key in the network switch input port enables the hash key to be generated while the remaining portion of the data packet is received, minimizing delays in packet latency through the network switch. Another aspect of this invention provides a network switch configured for outputting a data packet, the network switch comprising a first programmable register for storing a first number specifying a user-specified hash function, and a plurality of network switch ports configured for sending and receiving data packets, each network switch port comprising a hash key generator configured for generating a hash key in response to a received address of a corresponding data packet according to the user-specified hash function, the hash key specifying a corresponding one of a plurality of table entries in a rules checker storing switching logic. The programmable register enables the hash key to be set by a user, enabling different hash key configurations for different network architectures. Moreover, the hash key generator in each network switch port optimizes the efficiency of the rules checker by generating the hash key for a corresponding data packet as the data packet is being received.

U.S. Pat. No. 6,085,323, which issued to Shimizu, discloses an Information Processing System Having Function of Securely Protecting Confidential Information. This information processing system includes a first information processing apparatus and a second information processing apparatus arranged separate from the first information processing apparatus and capable of exchanging a signal with the first information processing apparatus. The first information processing apparatus includes a first key generator for generating a first key, and a first encrypting unit for encrypting data using the first key generated by the first key generator to generate first encrypted information. The second information processing apparatus includes a second key storage unit for storing a second key, and a second encrypting unit for encrypting the first key using the second key stored in the second storage unit to generate second encrypted information. The first information processing apparatus further includes a correlation storage unit for storing the first encrypted information generated by the first encrypting unit and the second encrypted information generated by the second encrypting unit, the first encrypted information being correlated with the second encrypted information. It is an object of this invention to provide an information processing apparatus, an information processing system, an information processing method, a recording medium, and a key determination method and apparatus, which are capable of protecting confidential information stored in the apparatus even if the apparatus is stolen and disassembled. It is another object of this invention to provide an information processing apparatus, an information processing system, an information processing method, a recording medium, and a key determination method and apparatus, capable of storing data shared by a plurality of users in an efficiently and safely encrypted form.

U.S. Pat. No. 6,104,810, which issued to DeBellis, discloses a Pseudorandom Number Generator with Backup and Restoration Capacity. In accordance with the invention, pseudorandom numbers are generated in a cryptographic module in a cryptographically strong manner by concatenating a time-dependent value (generated by a real-time counter) with a secret value and passing the concatenation result through a one-way hash function to generate a hash value from which a random number is generated. Because of this strong one-way function, given the output and any portion of the input, the remaining portion of the input can be computed only by exhaustive search. Entropy is continually added to the system so that breaking one pseudorandom number reveals only those pseudorandom numbers generated before entropy has been added. Thus, the current secret value is continually updated whenever the cryptographic module is idle by a first feedback function that generates a first updated secret value as a one-way function of the current secret value and the current time-dependent value. In addition, the current secret value is updated on the occurrence of a predetermined external event by a second feedback function that generates a second updated secret value as a one-way function of the current secret value, the current time-dependent value and an externally supplied value. Upon power-on reset, if the pseudorandom number generator has not been previously initialized, it initializes itself by resetting the time-dependent and secret values to zero and resetting an initialization count to a predetermined positive value. The initialization count is decremented each time an external event causes the second feedback function to update the secret value; initialization is complete when the initialization count has been decremented to zero. If on power-on reset the pseudorandom number generator has been previously initialized, the current time-dependent and current secret values are restored using values stored in backup registers. In accordance with this invention, to provide integrity and secrecy and to avoid replay attacks, periodic backup of the hardware information to nonvolatile storage is coupled with additional appropriate feedback, update and restoration algorithms. Backup, rather than being direct, uses a hashing function that is different from the hashing function used for normal update. More particularly, while the current time-dependent value is used as backup time-dependent value, a hash of the current secret value that is different from either feedback function is used as a backup secret value. This minimizes the possibility that restoration will result in repetition of pseudorandom numbers. More particularly, one aspect of this invention contemplates a backup and restoration system for a cryptographic pseudorandom number generator in which a secret value is replaced with an updated secret value generated as a first function of the current secret value and a time-dependent value and a pseudorandom number is generated as a second function of the secret value and time-dependent value differing from the first function. In accordance with this aspect of the invention, rather than deriving a backup secret value directly from the current secret value, a backup secret value is generated as a third function of the secret value and time-dependent value differing from the first function. Another aspect of this invention contemplates a backup and restoration system for a cryptographic pseudorandom number generator in which a pseudorandom number is generated as a function of a secret value and a time-dependent value. In accordance with this aspect of the invention, at a predetermined time (as at power-on reset) the pseudorandom number generator determines whether the time-dependent value and the secret value have been previously initialized. If the time-dependent value and the secret value have not been previously initialized, then the pseudorandom number generator initializes these values. On the other hand, if the time-dependent value and the secret value have been previously initialized, the pseudorandom number generator restores these values from backup values rather than reinitializing them.

Although most of these inventions provide a method to generate a key for data in certain way, none of the inventions provide a method or apparatus for generating keys that are both never repeating within certain period of time and difficult to guess. The current invention is a method and apparatus for generating a group of character sets that are both never repeating within certain period of time and difficult to guess. These character sets can be used as keys to secure data against unauthorized access. The current invention is a product that helps make Web sites faster and more secure.

Most Web sites for on-line shopping uses a number similar to a social security number to identify a user or a user's online shopping cart. The problem of this practice is that if a hacker guesses the Customer ID, that hacker may have access to the data associated with the on-line transactions. The current invention uses a complex mathematical formula to create special groups of characters, called "bodacions", that are too difficult for a hacker to guess. This makes the Web sites, and the customer's data, more secure. The current invention can also generate unique customer ID's, shopping cart ID's, order numbers, and other data that is both never repeating and difficult to guess.

Most types of communication can be classified as either "connection based" or "connectionless" systems. In a connection based system, the system maintains a persistent connection while the two end points are communicating back and forth in a conversation or session of some duration. The telephone system would be an example for a connection based system. When a caller place a call through the phone system, special digital and sometimes mechanical switches create a connection between the caller and a party that the caller is calling. In effect, the system emulates the presence of a wire between the caller and the party that the caller is calling.

In a connectionless system, the system breaks down communication to and from the communicating parties into discrete inbound and outbound transmissions. The Internet would be an example of a connectionless system. When a Web page with image A and image B is loaded, a Web browser may establish two connections to a server where image A and image B reside, one for each image. The server may have no idea that the two requests for image came from the same browser. The two requests for image A and image B, though seemingly part of the same Web page request, are actually two completely isolated conversations, and may take very different paths through Internet. Further more, a subsequent request for image C would be a brand new conversation, and the server would have no way to know that the request came from the same computer that just requested image A and image B.

Linking the requests together would involve the use of a unique session ID, which the two parties in a conversation must exchange upon each discrete connection. The use of session IDs allows a connectionless system to emulate a connection based system. These IDs can have many uses. These IDs can be used as customer number, order number, etc. By giving each customer and order a unique identifier, not unlike an ISBN for a book or a Social Security number for a person, the server can have knowledge of the identity of the customer upon each visit without a log in or authentication process. These IDs can also be used to insure a user has not modified data that are not authorized to be modified by the user from request to request. These IDs can also be used in secured remote access. If two parties can generate the same session ID at the same time, they can be assured of each other's identity. For example, if a server allows access to a resource by a certain client only at certain times, the client must send a session ID along with each request to access the server. If the client and server have the same session ID, the server may grant the client the access. There are countless other uses for unique session IDs, including keeping track of the time a user has been on a system, the number of accesses to that system from a single user, and more. Session IDs may also be hierarchical, providing a link between members of a group in connection based and connectionless systems alike. The uses are truly endless.

Systems that need to create session IDs face numerous significant challenges. These challenges can differ from system to system. First, it is difficult to guarantee the uniqueness of the session ID generated. For a session ID to be effective in linking discrete sections of a dialog in a connectionless system, the session ID for each dialog must be unique among all dialogs. For example, say a particular server assigns session IDs based on the time in seconds since the system began operation. If two users accessed the system within the same second, the server would think that these two users are actually the same user because same session ID has been assigned to these two different users. Depending on the complexity of the system and its user base, it can be difficult, if not impossible, to make a unique key from user data elements.

Second, it is difficult to defeat hackers. The guessing of session IDs by hackers, or computer bandits, is one of the most prolific methods used to break into systems. Session IDs created by even complex algorithms are simple to guess, and once a hacker has a session ID, it can assume any identity.

Third, it is computationally expensive to increase algorithm complexity. Some one to one hashing techniques and other methods of producing unique sessions are computationally expensive. A busy system may not have the computing resources to produce a session ID that is not simple to guess with some of these algorithms.

Fourth, it is impractical to adopt a pre-generated ID pool. To avoid the problems of uniqueness and CPU usage, some systems will pre-generate a list of session IDs and store them in a file or database. The trouble here is that all parts of the system that require a session ID will require access to that list of session IDs. When one ID issued, the system must lock the entire resource to be sure no two requests for an ID interfere with each other.

In view of all these problems, what is needed then is a method and apparatus for generating a group of character sets that are both never repeating within certain period of time and difficult to guess.

Accordingly, it is a principal object of my invention to provide a method and apparatus capable of fast generation of a group of character sets that are both never repeating within certain period of time and difficult to guess.

It is a further object of my invention to provide a method and apparatus capable of making web sites faster through its capability of fast generation of a group of character sets that are both never repeating within certain period of time and difficult to guess.

It is a still further object of my invention to provide a method and apparatus capable of making Web sites more secure through its capability of fast generation of a group of character sets that are both never repeating within certain period of time and difficult to guess.

It is a further object of my invention to provide a method and apparatus capable of allowing a connectionless system to emulate a connection based system.

It is a still further object of my invention to provide a method and apparatus capable of enabling a server to have knowledge of the identity of a customer upon each visit without a log in or authentication process.

It is a further object of my invention to provide a method and apparatus, which consumes little CPU resources, for generating a group of character sets that are both never repeating within certain period of time and difficult to guess.

It is a further object of my invention to provide a method and apparatus capable of generating a group of character sets, from a key in parallel, that are both never repeating within certain period of time and difficult to guess.

Other objects of my invention, as well as particular features, elements, and advantages thereof, will be elucidated in, or apparent from, the following description and the accompanying drawing figures.

SUMMARY OF THE INVENTION

According to my present invention I have provided a method and apparatus for generating a group of character sets that are both never repeating within certain period of time and difficult to guess.

The method for generating a group of character sets that are both never repeating within certain period of time and difficult to guess comprises (a) generating a request for said character set by a client of a character-generating server, (b) sending said request by said client to said character-generating server, (c) generating a pseudo random number required by said character generator, (d) sending said pseudo random number to said character generator, (e) generating a character for said character set by said character generator, and (f) sending said character set by said character-generating server to said client. The method further comprises repeating (c) to (e) until all said characters of said character set have been generated.

The character-generating server further comprises a character generator, a random generator connecting to said character generator, a temporal reference storage connecting to said character generator and storing the most current time information, and a key-pool group connecting to said character generator. The character-generating server might have plurality of key-pool groups. Each key-pool group has a key and at least a pool. The pool is a list of mapping positions in said key. The mapping position is marked "used" each time said character-generating server makes a character from said key. The character-generating server clears said pool each time said pool is full, or every tick, whichever comes first.

The character-generating server has an external timer device and a network interface, through which the client connects to the character-generating server. The external timer device is capable of providing both a current time and a periodic tick to the character-generating server. The network interface is capable of providing said character generating-server access to functions to encode and send out information, and to receive and decode information.

The character set generated by character generator is defined by a geometric progression of $x(n)=p(x(n-1)+i)$, which manifests itself as a chaotic progression of orbits around an origin. The orbit is defined as a unique, continuous path around said origin and never crosses in on itself or any other orbit. The $x(n)$ and $x(n-1)$ represents different character sets. The n represents the number of said character set generated by said character-generating server. The i represents a temporal difference between the time when two sequential orbits cross an arbitrary infinite vector from said origin. The p represents a period, which is the temporal difference between character sets along an orbit. The geometric progression defines said pre-set number of periods per orbit. The random generator makes a pseudo random number required by said character generator to select a position on said orbit. The character-generating server is capable of generating several different kind of character set. The character-generating server listens on a fixed port for requests from said client, which can be either a single client or a group of unrelated clients, and never produces any uninitiated transmissions to said client.

The apparatus for generating a group of character sets that are both never repeating within certain period of time and difficult to guess comprises a character-generating server, a network interface connecting to the character generator, and an external timer device connecting to the character generator. The character-generating server further comprises a character generator, a random generator connecting to the character generator, a temporal reference storage connecting to the character generator storing the most current time information, and a key-pool group connecting to the character generator. The character-generating server is capable of generating several different kinds of character sets. The character-generating server has a plurality of key-pool groups.

The network interface is capable of providing said character generating-server access to functions to encode and send out information, and to receive and decode information.

The character set generated by the character generator is defined by a geometric progression of $x(n)=p(x(n-1)+i)$. The geometric progression manifests itself as a chaotic progression of orbits around an origin. The orbit is defined as a unique, continuous path around the origin and never crosses in on itself or any other orbit. The $x(n)$ and the $x(n-1)$ represent different character sets. The n represents the number of said character set generated by the character-generating server. The i represents a temporal difference between the time when two sequential orbits crosses an arbitrary infinite vector from the origin. The p represents a period, which is the temporal difference between character sets along an orbit. The geometric progression defines the pre-set number of periods per orbit.

The random generator makes a pseudo random number required by said character generator to select a position on said orbit. The pool is a list of mapping positions in the key. The mapping position is marked "used" each time the character-generating server makes a character from the key. The character-generating server clears the pool each time the pool is fill, or every tick, whichever comes first. The character-generating server is capable of generating at least the pre-set number of the character sets every tick.

The character-generating server listens on a fixed port for requests from a client, which can be either a single client or a group of clients, and never produces any uninitiated transmissions to the client.

The apparatus for generating a group of character sets that are both never repeating within certain period of time and difficult to guess might also include a remote application, which connects to the character-generating server through the network interface. The remote application has a character-generating utility program, which defines function prototypes for configuring the remote application connection to the character-generating server, and an application program interface, which allows the remote application to query the character-generating server.

DESCRIPTION OF THE DRAWINGS

Other features of my invention will become more evident from a consideration of the following detailed description of my patent drawings, as follows:

FIG. 1 is a preferred embodiment of an apparatus for generating a group of character sets that are both never repeating within certain period of time and difficult to guess;

FIG. 2 is the structure of the character-generating server;

FIG. 4 is the matrix used in the preferred embodiment of this invention;

FIG. 7 is a second embodiment of an apparatus for generating a group of character sets that are both never repeating within certain period of time and difficult to guess; and FIG. 8 is a chart for a useful application of the bodacion.

DETAILED DESCRIPTION OF THE PREFERRED EMBODIMENT

Figure 3:
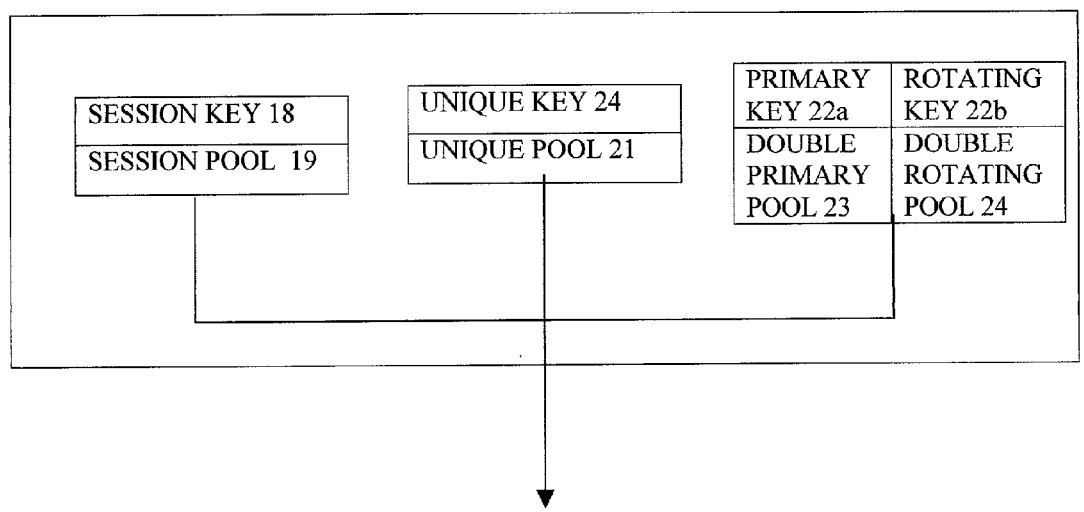
FIG. 3 is the structure of the key-pool group.

FIG. 1 is a preferred embodiment of an apparatus for generating a group of character sets that are both never repeating within certain period of time and difficult to guess 10. The apparatus 10 comprises a character-generating server 11, a network interface 12 and an external timer device 13, both of which are connecting to the character-generating server. The external timer device 13 is capable of providing both a current time and a periodic tick to the character-generating server 11. In the preferred embodiment, the external timer device 13 provides a periodic tick of approximately one second to the character-generating server 11. Upon each tick, the character-generating server 11 increments the values in the temporal reference storage, and clears all pools 19, 21, 23 and 24 in FIG. 3. The time length between any two consecutive periodic tick is adjustable. The character-generating server 11 can exist either as a single task in an embedded environment, a single process daemon in a UNIX environment, a physical circuit or a microchip. The network interface 12 provides said character generating-server 11 with access to functions to encode and send out information, and to receive and decode information.

Referring now to FIG. 2, the character-generating server 11 further comprises a character generator 14, a random generator 15 connecting to said character generator 14, a temporal reference storage 16 connecting to said character generator 14, and a key-pool group 17 connecting to said character generator 14. The temporal reference storage 16 stores the most current time information.

Referring now to FIG. 3, the key-pool group 17 may include a first kind of key called session key 18 with a first kind of pool called session pool 19, a second kind of key called unique key 20 with a second kind of pool called unique pool 21, and a third kind of key called double key 22 with a third kind of pool having two parts, one of which is called double primary pool 23, the other of which is called double rotating pool 24. The character generating server 11 will clear the session pool 19 each time the session pool 19 is full, or every one tick, whichever comes first. The unique pool 21, double primary pool 23 and double rotating pool 24 are always clear every one tick. In the preferred embodiment, one tick equals to approximately one second.

The character set generated by the character-generating server 11 is called bodacion. The bodacion is essentially a whole number mapped to a matrix of specially selected letters and numbers 30 in FIG. 4. The matrix of characters 30 is created by assigning each potential character to a number from 1 to 32 using a complex polynomial. The size of the matrix 30 does not need to be 32, it can be multiple of 32. The number of characters in the matrix 30 defines not only the length of the bodacion, but the number of the bodacion generated by the character-generating server 11 as well. For example, when the matrix 30 has 32 characters, each bodacion generated by the character-generating server 11 will have 32 digits, and the character-generating server 11 is capable of generating 1,065,151,899,408 session bodacions, 32 unique bodacions and 1024 double bodacions per tick. When the size of the matrix increases, the character-generating server 11 will be able to generate more bodacions of any kinds per tick. In the preferred embodiment, the character-generating server 11 is capable of generating 1,065,151,889,408 session bodacions before it repeats a value if all the session bodacions are requested in a constant stream. Actual number of session bodacions generated before repeating depends on the character-generating server 11 restarts and idle time.

In FIG. 4, 32 different characters have been listed along with assigned number from 1 to 32. The matrix 30 intentionally excludes characters such as lower case l (el) and the number 1 (one), because in certain computer fonts, these characters may appear identical. Similar reasons preclude the use of the letter O (oh) and the number 0 (zero). Of course, the matrix 30 can be re-arranged in any way with any characters. As long as the size of the matrix 30 stays the same, the character-generating server 11 will have the same capacity in generating the bodacions. Theoretically, there is no limitation as to what kinds of character can be used in the matrix 30.

The mapping into the matrix 30 is chosen using a geometric progression of the form $x(n)=p(x(n-1)+i)$ called the "Raki" series. The exact form of the Raki series manifests itself as a chaotic progression of orbits 44 around an origin 41, roughly shown in FIG. 5. The line 40 represents the values of the Raki series moving around the origin 41. The magnitude of the origin 41 is not relevant to the orbital paths.

Figure 5:
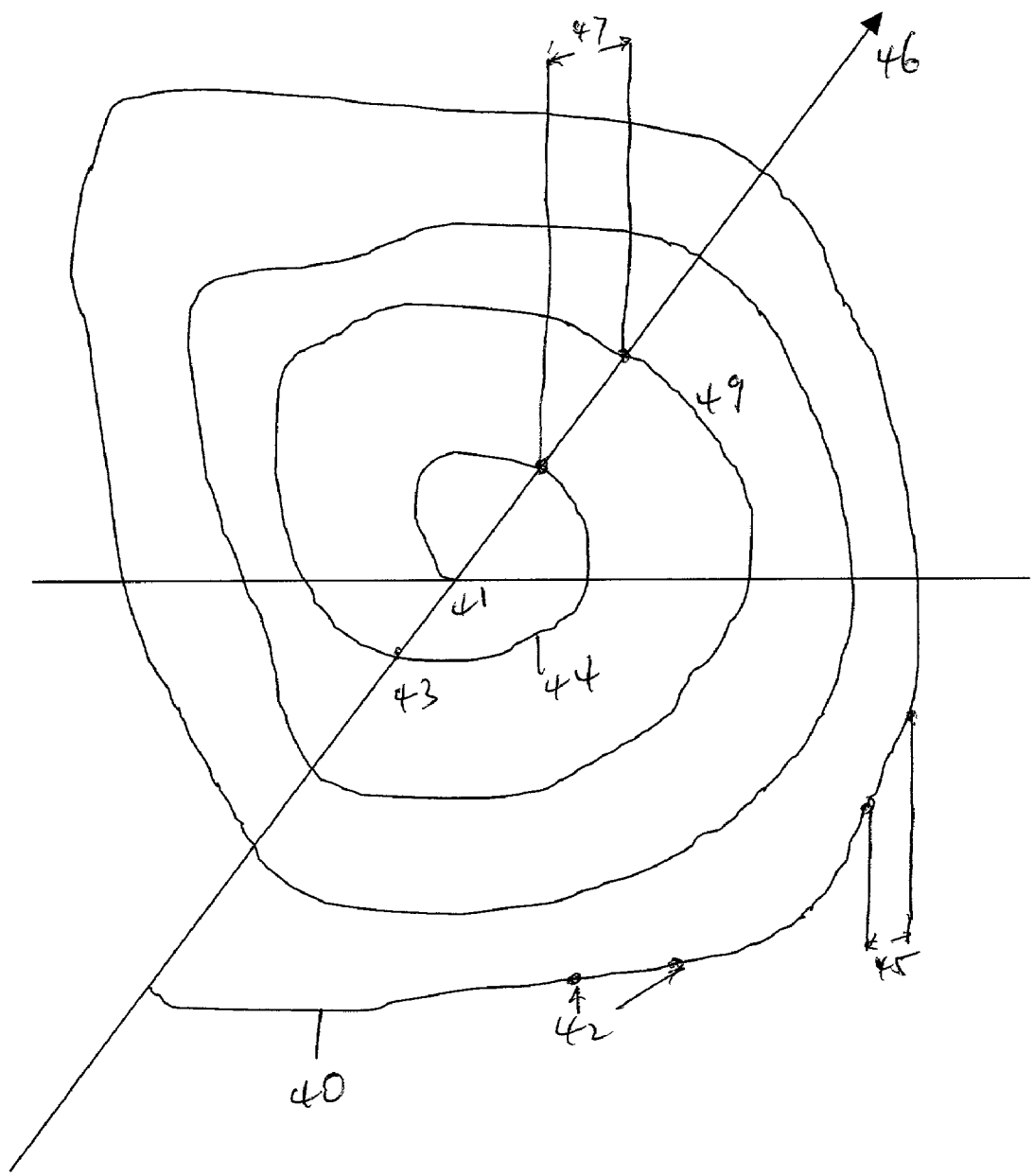
FIG. 5 is a geometric progression of the Raid Series.

Referring now to FIGS. 4 and 5, a bodacion 42 is defined as the value of the Raki series as mapped to a matrix 30 of computer characters. The character generator 14 runs the Raki series and produces any of the possible bodacion types. Each time the character generator 14 creates a bodacion from a given position in the matrix 30, it set that position in the pool to "used". The session pool 19 is a list of mapping positions in the session key 18, and the mapping position is marked "used" each time said character generator 14 makes a character from the session key. The unique pool 21 is a list of mapping positions in the unique key 20, and the mapping position is marked "used" each time said character generator 14 makes a character from said unique key. The double pool comprises a double primary pool 23 and a double rotating pool 24. The double key 22 comprises a primary key 22a and a rotating key 22b. The double primary pool 23 is a list of primary mapping positions in said primary key 22a and said double rotating pool 24 is a list of rotating mapping positions in said rotating key 22b. The primary mapping position is marked "used" each time said character generator 14 makes a character from said primary key 22a, and said rotating mapping position is marked "used" each time said character generator 14 makes a character from said rotating key 22b.

In the preferred embodiment, since the size of matrix 30 is 32, the number of bodacions defined by the Raki series is 32!. An orbit 44 is defined as a unique and continuous path around an origin 41 that never crosses in on itself or any other orbit 44. The Raki series defines an infinite number of orbitals, but only about 33 billion of these orbits easily map to the character matrix (32?–32?). A period 45 is the temporal difference between bodacions 42 along an orbit 44. In the preferred embodiment, the Raki series defines 32 periods 45 per orbit 44 to accommodate 32 bodacions 42 on each orbital path before a bodacion 42 will repeat. A cycle 47 is the temporal difference between the time when two sequential orbits 44 cross an arbitrary infinite vector 46 from the origin 41. A seed 48 is the value of the Raki series as it moves from one orbit 44 to the next, defined by its crossing of an arbitrary infinite vector 46 from the origin 41. Although any bodacion 42 is created with the Raki series, the orbit 44 and the seed 48 may be fed into the Raki series to create reproducible bodacions 42. If a continuously growing seed 48 and orbit 44 are used, the bodacions 42 shall be unique within that data space. For example, if time is used, bodacions 42 will temporally unique within the entire set of bodacions 42. If a sine wave is used, the first bodacion 42 would be repeated after $\pi$ orbits 44.

In the preferred embodiment, the character-generating server 11 is capable of generating at least three kinds of bodacions, including the session bodacion, the unique bodacion and the double bodacion. The session bodacion is easier to guess than the unique bodacion and the double bodacion. The double bodacion is an extension of the unique bodacion in the sense that the double bodacion will not repeat for twenty-eight years in the preferred embodiment with an approximately one second per tick, but is simpler to guess than the unique bodacion.

The character-generating server 11 listens on a fixed port for requests from a client and never produces any uninitiated transmissions to the client. This means that the character-generating server will only produce and a bodacion and send it out to the client after each request, and will never check whether the bodacion is actually received by the client. A character-generating server 11 can produce bodacions for a single client or a group of clients.

Figure 6:
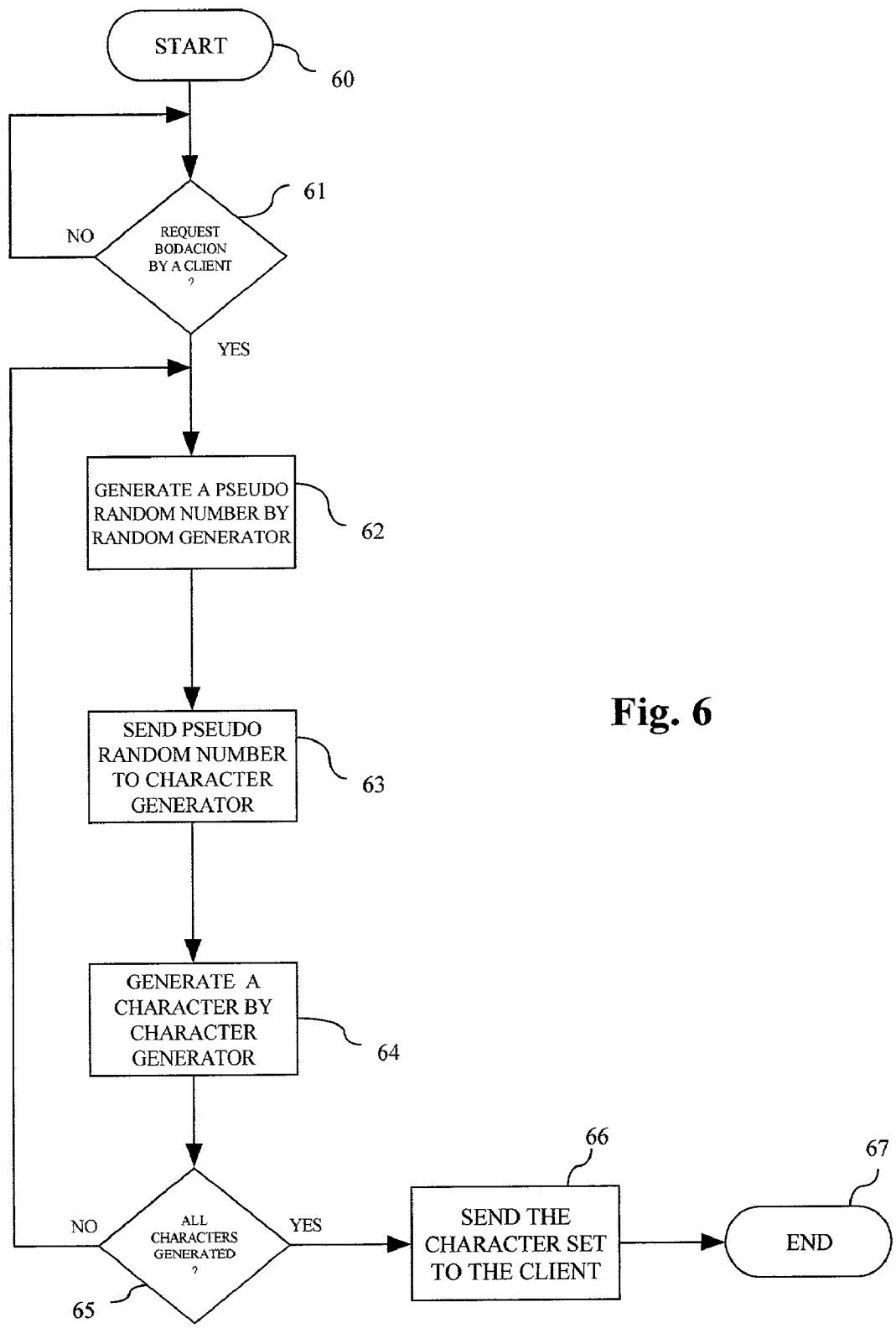
FIG. 6 is a flow chart of a method for generating a group of character sets that are both never repeating within certain period of time and difficult to guess.

Referring now to FIG. 6, which is a flow chart of a method for generating a group of character sets that are both never repeating within certain period of time and difficult to guess. A procedure starts at block 60, and proceeds immediately to block 61, where a check is conducted to determine if a request for a bodacion by a client has been received by the character-generating server 11. If NO, the procedure continues looping awaiting a request for a bodacion by a client. If YES, the procedure proceeds to block 62. At block 62, the random generator 15 generates a pseudo random number required by the character generator 14 to select a position on the orbit 44, and proceeds to block 63. At block 63, the random generator 15 sends the pseudo random number to the character generator 14, and proceeds to block 64. At block 64, the character generator 14 generates a character for the requested bodacion based on a geometric progression of $x(n)=p(x(n-1)+i)$, and proceeds to block 65. At block 65, a check is conducted to determine if all the characters for a bodacion have been generated by the character generator 14. If NO, the procedure goes back to block 62. Returning to block 65, if all the characters for a bodacion have been generated by the character generator 14, the procedure proceeds to block 66. At block 66, the procedure sends the generated bodacion to the client, and proceeds to block 67, and ends right there.

FIG. 7 is a second embodiment of an apparatus for generating a group of character sets that are both never repeating within certain period of time and difficult to guess 70. The apparatus 70 comprises a character-generating server 11, a network interface 12, an external timer device 13 and a remote application 71. Both the network interface 12 and the external timer device 13 are connecting to the character-generating server 11. The remote application 71 is connecting to the character-generating server 11 through the network interface 12. The remote application 71 has a character-generating utility program 72 and an application program interface 73. The character-generating utility program 72 defines function prototypes for configuring the remote application 71 connection to the character-generating server 11. The application program interface 73 allows the remote application 71 to query the character-generating server 11.

FIG. 8 is a chart for a useful application of the bodacion. When a remote application 71 wants to access a target server 82, the remote application 71 first generates a key by itself, and sends the key along with a request for a bodacion to the character-generating server 11. The bodacion that is requested can be any type of bodacion. The character-generating server 11 generates a bodacion from the key received from the remote application 71, and sends the key along with the generated bodacion back to the remote application 71. The remote application 71 will then send the key along with the bodacion to target server 82 to request a permission to access the target server 82. The target server 82 will then send the key received from the remote application 71 along with a request for bodacion to the character-generating server 11. The character-generating server 11 will again generate the same bodacion from the key received from the target server 82, and send the bodacion along with the key back to the target server 82. The target server 82 then compares the bodacion received from the character-generating server 11 to the bodacion received from the remote application 71. If they are the same bodacion, an access will be granted to the remote application 71. Otherwise, access will be denied to the remote application 71.

Hence, the present invention provides a method and apparatus for generating a group of character sets that are both never repeating within certain period of time and difficult to guess.

The present invention also provides a method and apparatus capable of making web sites faster through its capability of fast generation of a group of character sets that are both never repeating within certain period of time and difficult to guess.

The present invention further provides a method and apparatus capable of making Web sites more secure through its capability of fast generation of a group of character sets that are both never repeating within certain period of time and difficult to guess.

The present invention still further provides a method and apparatus capable of allowing a connectionless system to emulate a connection based system.

The present invention further provides a method and apparatus capable of enabling a server to have knowledge of the identity of a customer upon each visit without a log in or authentication process.

The present invention still further provides a method and apparatus, which consumes little CPU resources, for generating a group of character sets that are both never repeating within certain period of time and difficult to guess.

The present invention further provides a method and apparatus capable of generating a group of character sets, from a key in parallel, that are both never repeating within certain period of time and difficult to guess.

As various possible embodiments may be made in the above invention for use for different purposes and as various changes might be made in the embodiments and methods above set forth, it is understood that all of the above matters here set forth or shown in the accompanying drawings are to be interpreted as illustrative and not in a limiting sense.

I claim:

1. An apparatus for generating a group of character sets that are both never repeating within certain period of time and difficult to guess, said apparatus comprising:

a character-generating server, said character-generating server existing either as a single task in an embedded environment, a single process daemon in a UNIX environment, a physical circuit or a microchip, said character-generating server comprising a character generator, a random generator connecting to said character generator, a temporal reference storage connecting to said character generator, said temporal reference storage storing the most current time information, and a key-pool group connecting to said character generator, said key-pool group including any or all of a first type of key with a first type of pool, a second type of key with a second type of pool, and a third type of key with a third type of pool, said character generator capable of generating a character set, said character set having thirty-two different characters, based on a geometric progression of $x(n)=p(x(n-1)+i)$, said geometric progression manifesting itself as a chaotic progression of orbits around an origin, said orbit being defined as a unique and continuous path around said origin and never crossing in on itself or any other orbit, said $x(n)$ and said $x(n-1)$ representing different character set, said n representing the number of said character set generated by said character-generating server, said i representing a temporal difference between the time when two sequential orbits cross an arbitrary infinite vector from said origin, said p representing a period, said period being the temporal difference between character sets along any of said orbit, said geometric progression defining thirty-two periods on any of said orbit, said character set being a first type of character set, a second type of character set or a third type of character set;

a network interface, said network interface connecting to said character generator and capable of providing said character generating-server with access to functions to encode and send out information, and to receive and decode information; and an external timer device, said external timer device connecting to said character-generating server and capable of providing both a current time and a periodic tick of approximately one second to said character-generating server.

2. The apparatus in claim 1, wherein said random generator makes a pseudo random number required by said character generator to select a position on said orbit.

3. The apparatus in claim 1, wherein said first type of pool is a list of first type of mapping positions in said first type of key, said first type of mapping position is marked "used" each time said character-generating server makes a character from said first type of key.

4. The apparatus in claim 1, wherein said second type of pool is a list of second type of mapping positions in said second type of key, said second type of mapping position is marked "used" each time said character-generating server makes a character from said second type of key.

5. The apparatus in claim 1, wherein said third type of pool comprises a double primary pool and a double rotating pool, said third type of key comprises a primary key and a rotating key, said double primary pool is a list of primary mapping positions in said primary key, said double rotating pool is a list of rotating mapping positions in said rotating key, said primary mapping position is marked "used" each time said character-generating server makes a character from said primary key, and said rotating mapping position is marked "used" each time said character-generating server makes a character from said rotating key.

6. The apparatus in claim 1, wherein said character-generating server clears said pool each time said pool is full, or every one second, whichever comes first.

7. The apparatus in claim 1, wherein said character-generating server is capable of generating 1,065,151,889, 408 said first type of character sets before it repeats a value if all said first type of character sets are requested in a constant stream, actual number of said first type of character set generated before repeating depends on said character-generating server restarts and idle time.

8. The apparatus in claim 1, wherein said character-generating server is capable of generating 1,065,151,899, 408 said first type of character sets every one second.

9. The apparatus in claim 1, wherein said character-generating server is capable of generating thirty-two said second type of character sets every one second.

10. The apparatus in claim 1, wherein said character-generating server is capable of generating 1024 said third type of character sets every one second.

11. The apparatus in claim 1, wherein said first type of character set is easier to guess than either said second type of character set or said third type of character set.

12. The apparatus in claim 1, wherein said second type of character set is guaranteed to not repeat for twenty-eight years from the activation of the character-generating server.

13. The apparatus in claim 1, wherein said third type of character set is an extension of a second type of character set in the sense that it will not repeat for twenty-eight years, said third type of character set is simpler to guess than said second type of character set.

14. The apparatus in claim 1, wherein said character-generating server listens on a fixed port for requests from a client, said client can be a single client or a group of clients, and never produces any uninitiated transmissions to said client.

15. An apparatus for generating a group of character sets that are both never repeating within certain period of time and difficult to guess, said apparatus comprising:

a character-generating server, said character-generating server comprising a character generator, a random generator connecting to said character generator, a temporal reference storage connecting to said character generator, said temporal reference storage storing the most current time information, and a key-pool group connecting to said character generator, said key-pool group including any or all of a first type of key with a first type of pool, a second type of key with a second type of pool, and a third type of key with a third type of pool, said character generator capable of generating a character set, said character set having a pre-set number of different characters, based on a geometric progression of $x(n)=p(x(n-1)+i)$, said geometric progression manifesting itself as a chaotic progression of orbits around an origin, said orbit being defined as a unique and continuous path around said origin and never crossing in on itself or any other orbit, said $x(n)$ and said $x(n-1)$ representing different character set, said n representing the number of said character set generated by said character-generating server, said i representing a temporal difference between the time when two sequential orbits crossing an arbitrary infinite vector from said origin, said p representing a period, said period being the temporal difference between character sets along any of said orbit, said geometric progression defining said pre-set number of periods on any of said orbit, said character set being a first type of character set, a second type of character set and a third type of character set;

a network interface, said network interface connecting to said character generator and capable of providing said character generating-server with access to functions to encode and send out information, and to receive or decode information; and an external timer device, said external timer device connecting to said character-generating server and capable of providing both a current time and a periodic tick to said character-generating server, time interval between any of two consecutive said periodic ticks being adjustable.

16. The apparatus in claim 15, wherein said random generator makes a pseudo random number required by said character generator to select a position on said orbit.

17. The apparatus in claim 15, wherein said first type of pool is a list of first type of mapping positions in said first type of key, said first type of mapping position is marked "used" each time said character-generating server makes a character from said first type of key.

18. The apparatus in claim 15, wherein said second type of pool is a list of second type of mapping positions in said second type of key, said second type of mapping position is marked "used" each time said character-generating server makes a character from said second type of key.

19. The apparatus in claim 15, wherein said third type of pool comprises a double primary pool and a double rotating pool, said third type of key comprises a primary key and a rotating key, said double primary pool is a list of primary mapping positions in said primary key, said double rotating pool is a list of rotating mapping positions in said rotating key, said primary mapping position is marked "used" each time said character-generating server makes a character from said primary key, and said rotating mapping position is marked "used" each time said character-generating server makes a character from said rotating key.

20. The apparatus in claim 15, wherein said character-generating server clears said pool each time said pool is full, or every said tick, whichever comes first.

21. The apparatus in claim 15, wherein said character-generating server is capable of generating a significant large number of said first type of character sets before it repeats a value if all said first type of character sets are requested in a constant stream, actual number of said first type of character set generated before repeating depends on said character-generating server restarts and idle time.

22. The apparatus in claim 15, wherein said character-generating server is capable of generating a significant large number of said first type of character sets every tick.

23. The apparatus in claim 15, wherein said character-generating server is capable of generating said pre-set number of said second type of character sets every tick.

24. The apparatus in claim 15, wherein said character-generating server is capable of generating a large number of said third type of character sets every tick.

25. The apparatus in claim 15, wherein said first type of character set is easier to guess than either said second type of character set or said third type of character set.

26. The apparatus in claim 15, wherein said second type of character set is guaranteed to not repeat for a certain period of time from the activation of the character-generating server.

27. The apparatus in claim 15, wherein said third type of character set is an extension of a second type of character set in the sense that it will not repeat for a certain period of time, said third type of character set is simpler to guess than said second type of character set.

28. The apparatus in claim 15, wherein said character-generating server listens on a fixed port for requests from a client, said client can be a single client or a group of clients, and never produces any uninitiated transmissions to said client.

29. An apparatus for generating a group of character sets that are both never repeating within certain period of time and difficult to guess, said apparatus comprising:
a character-generating server, said character-generating server comprising a character generator, a random generator connecting to said character generator, a temporal reference storage connecting to said character generator, said temporal reference storage storing the most current time information, and a key-pool group, said key-pool group having a key and a pool, connecting to said character generator, said character generator capable of generating a character set, said character set having a preset number of different characters, based on a geometric progression of $x(n)=p(x(n-1)+i)$, said geometric progression manifesting itself as a chaotic progression of orbits around an origin, said orbit being defined as a unique and continuous path around said origin and never crossing in on itself or any other orbit, said $x(n)$ and said $x(n-1)$ representing different character set, said n representing the number of said character set generated by said character-generating server, said i representing a temporal difference between the time when two sequential orbits crossing an arbitrary infinite vector from said origin, said p representing a period, said period is the temporal difference between character sets along any of said orbit, said geometric progression defining said pre-set number of periods on any of said orbit;
a network interface, said network interface connecting to said character generator and capable of providing said character generating-server with access to functions to encode and send out information, and to receive and decode information; and
an external timer device, said external timer device connecting to said character-generating server and capable of providing both a current time and a periodic tick to said character-generating server, time interval between any of two consecutive said periodic ticks being adjustable.

30. The apparatus in claim 29, wherein said character-generating server is capable of generating several different type of character set.

31. The apparatus in claim 29, wherein said character-generating server has a plurality of key-pool groups.

32. The apparatus in claim 29, wherein said key-pool group has a key and a plurality of pools.

33. The apparatus in claim 29, wherein said random generator makes a pseudo random number required by said character generator to select a position on said orbit.

34. The apparatus in claim 29, wherein said pool is a list of mapping positions in said key, said mapping position is marked "used" each time said character-generating server makes a character from said key.

35. The apparatus in claim 29, wherein said character-generating server clears said pool each time said pool is full, or every said tick, whichever comes first.

36. The apparatus in claim 29, wherein said character-generating server is capable of generating at least said pre-set number of character sets every tick.

37. The apparatus in claim 29, wherein said character-generating server listens on a fixed port for requests from a client, said client can be a single client or a group of clients, and never produces any uninitiated transmissions to said client.

38. An apparatus for generating a group of character sets that are both never repeating within certain period of time and difficult to guess, said apparatus comprising:
a character-generating server, said character-generating server existing either as a single task in an embedded environment, a single process daemon in a UNIX environment, a physical circuit or microchip, said character-generating server comprising a character generator, a random generator connecting to said character generator, a temporal reference storage connecting to said character generator, said temporal reference storage storing the most current time information, and a key-pool group connecting to said character generator, said key-pool group including any or all of a first type of key with a first type of pool, a second type of key with a second type of pool, and a third type of key with a third type of pool, said character generator capable of generating a character set, said character set having thirty-two different characters, based on a geometric progression of $x(n)=p(x(n-1)+i)$, said geometric progression manifesting itself as a chaotic progression of orbits around an origin, said orbit being defined as a unique and continuous path around said origin and never crossing in on itself or any other orbit, said $x(n)$ and said $x(n-1)$ representing different character set, said n representing the number of said character set generated by said character-generating server, said i representing a temporal difference between the time when two sequential orbits cross an arbitrary infinite vector from said origin, said p representing a period, said period being the temporal difference between character sets along any of said orbit, said geometric progression defining thirty-two periods on any of said orbit, said character set being a first type of character set, a second type of character set or a third type of character set;
a network interface, said network interface connecting to said character generator and capable of providing said character generating-server with access to functions to encode and send out information, and to receive and decode information;
an external timer device, said external timer device connecting to said character-generating server and capable of providing both a current time and a periodic tick of approximately one second to said character-generating server; and
a remote application, said remote application connecting to said character-generating server through said network interface, said remote application having a character-generating utility program, said character-generating utility program defining function prototypes for configuring said remote application connection to said character-generating server, and an application program interface, said application program interface allowing said remote application to query said character-generating server for said first type of character set, said second type of character set and said third type of character.

39. The apparatus in claim 38, wherein said random generator makes a pseudo random number required by said character generator to select a position on said orbit.

40. The apparatus in claim 38, wherein said first type of pool is a list of first type of mapping positions in said first type of key, said first type of mapping position is marked "used" each time said character-generating server makes a character from said first type of key.

41. The apparatus in claim 38, wherein said second type of pool is a list of second type of mapping positions in said second type of key, said second type of mapping position is marked "used" each time said character-generating server makes a character from said second type of key.

42. The apparatus in claim 38, wherein said third type of pool comprises a double primary pool and a double rotating pool, said third type of key comprises a primary key and a rotating key, said double primary pool is a list of primary mapping positions in said primary key, said double rotating pool is a list of rotating mapping positions in said rotating key, said primary mapping position is marked "used" each time said character-generating server makes a character from said primary key, and said rotating mapping position is marked "used" each time said character-generating server makes a character from said rotating key.

43. The apparatus in claim 38, wherein said character-generating server clears said pool each time said pool is full, or every one second, whichever comes first.

44. The apparatus in claim 38, wherein both said character-generating server and said remote application are capable of generating 1,065,151,889,408 said first type of character set before it repeats a value if all said groups of first type of character sets are requested in a constant stream, actual number of said first type of character set generated before repeating depends on said character-generating server restarts and idle time.

45. The apparatus in claim 38, wherein both said character-generating server and said remote application are capable of generating 1,065,151,899,408 said first type of character sets every one second.

46. The apparatus in claim 38, wherein both said character-generating server and said remote application are capable of generating thirty-two said second type of character sets every one second.

47. The apparatus in claim 38, wherein both said character-generating server and said remote application are capable of generating 1024 said third type of character sets every one second.

48. The apparatus in claim 38, wherein said first type of character set is easier to guess than either said second type of character set or said third type of character set.

49. The apparatus in claim 38, wherein said second type of character set is guaranteed to not repeat for twenty-eight years from the activation of the character-generating server.

50. The apparatus in claim 38, wherein said third type of character set is an extension of a second type of character set in the sense that it will not repeat for twenty-eight years, said third type of character set is simpler to guess than said second type of character set.

51. The apparatus in claim 38, wherein said character-generating server listens on a fixed port for requests from said remote application, said remote application can be a single remote application or a group of remote applications, and never produces any uninitiated transmissions to said remote application.

52. An apparatus for generating a group of character sets that are both never repeating within certain period of time and difficult to guess, said apparatus comprising:

a character-generating server, said character-generating server comprising a character generator, a random generator connecting to said character generator, a temporal reference storage connecting to said character generator, said temporal reference storage storing the most current time information, and a key-pool group connecting to said character generator, said key-pool group including any or all of a first type of key with a first type of pool, a second type of key with a second type of pool, and a third type of key with a third type of pool, said character generator capable of generating a character set, said character set having a pre-set number of different characters, based on a geometric progression of $x(n)=p(x(n-1)+i)$, said geometric progression manifesting itself as a chaotic progression of orbits around an origin, said orbit being defined as a unique and continuous path around said origin and never crossing in on itself or any other orbit, said $x(n)$ and said $x(n-1)$ representing different character set, said n representing the number of said character set generated by said character-generating server, said i representing a temporal difference between the time when two sequential orbits crossing an arbitrary infinite vector from said origin, said p representing a period, said period being the temporal difference between character sets along any of said orbit, said geometric progression defining said pre-set number of periods on any of said orbit, said character set being a first type of character set, a second type of character set and a third type of character set;

a network interface, said network interface connecting to said character generator and capable of providing said character generating-server with access to functions to encode and send out information, and to receive and decode information;

an external timer device, said external timer device connecting to said character-generating server and capable of providing both a current time and a periodic tick to said character-generating server, time interval between any of two consecutive said periodic ticks being adjustable; and a remote application, said remote application connecting to said character-generating server through said network interface, said remote application having a character-generating utility program, said character-generating utility program defining function prototypes for configuring said remote application connection to said character-generating server, and an application program interface, said application program interface allowing said remote application to query said character-generating server for said first type of character set, said second type of character set and said third type of character.

53. The apparatus in claim 52, wherein said random generator makes a pseudo random number required by said character generator to select a position on said orbit.

54. The apparatus in claim 52, wherein said first type of pool is a list of first type of mapping positions in said first type of key, said first type of mapping position is marked "used" each time said character-generating server makes a character from said first type of key.

55. The apparatus in claim 52, wherein said second type of pool is a list of second type of mapping positions in said second type of key, said second type of mapping position is marked "used" each time said character-generating server makes a character from said second type of key.

56. The apparatus in claim 52, wherein said third type of pool comprises a double primary pool and a double rotating pool, said third type of key comprises a primary key and a rotating key, said double primary pool is a list of primary mapping positions in said primary key, said double rotating pool is a list of rotating mapping positions in said rotating key, said primary mapping position is marked "used" each time said character-generating server makes a character from said primary key, and said rotating mapping position is marked "used" each time said character-generating server makes a character from said rotating key.

57. The apparatus in claim 52, wherein said character-generating server clears said pool each time said pool is full, or every said tick, whichever comes first.

58. The apparatus in claim 52, wherein said character-generating server is capable of generating a significant large number of said first type of character sets before it repeats a value if all said groups of first type of character sets are requested in a constant stream, actual number of said first type of character set generated before repeating depends on said character-generating server restarts and idle time.

59. The apparatus in claim 52, wherein both said character-generating server and said remote application are capable of generating a significant large number of said first type of character sets every tick.

60. The apparatus in claim 52, wherein both said character-generating server and said remote application are capable of generating said pre-set number of said second type of character sets every tick.

61. The apparatus in claim 52, wherein both said character-generating server and said remote application are capable of generating a large number of said third type of character sets every tick.

62. The apparatus in claim 52, wherein said first type of character set is easier to guess than either said second type of character set or said third type of character set.

63. The apparatus in claim 52, wherein said second type of character set is guaranteed to not repeat for a certain period of time from the activation of the character-generating server.

64. The apparatus in claim 52, wherein said third type of character set is an extension of a second type of character set in the sense that it will not repeat for a certain period of time, said third type of character set is simpler to guess than said second type of character set.

65. The apparatus in claim 52, wherein said character-generating server listens on a fixed port for requests from said remote application, said remote application can be a single remote application or a group of remote applications, and never produces any uninitiated transmissions to said client.

66. An apparatus for generating a group of character sets that are both never repeating within certain period of time and difficult to guess, said apparatus comprising:
    a character-generating server, said character-generating server comprising a character generator, a random generator connecting to said character generator, a temporal reference storage connecting to said character generator, said temporal reference storage storing the most current time information, and a key-pool group, said key-pool group having a key and a pool, connecting to said character generator, said character generator capable of generating a character set, said character set having a preset number of different characters, based on a geometric progression of $x(n)=p(x(n-1)+i)$, said geometric progression manifesting itself as a chaotic progression of orbits around an origin, said orbit being defined as a unique and continuous path around said origin and never crossing in on itself or any other orbit, said $x(n)$ and said $x(n-1)$ representing different character set, said n representing the number of said character set generated by said character-generating server, said i representing a temporal difference between the time when two sequential orbits crossing an arbitrary infinite vector from said origin, said p representing a period, said period being the temporal difference between character sets along any of said orbit, said geometric progression defining said pre-set number of periods on any of said orbit;
    a network interface, said network interface connecting to said character generator and capable of providing said character generating-server with access to functions to encode and send out information, and to receive and decode information;
    an external timer device, said external timer device connecting to said character-generating server and capable of providing both a current time and a periodic tick to said character-generating server, time interval between any of two consecutive said periodic ticks being adjustable; and
    a remote application, said remote application connecting to said character-generating server through said network interface, said remote application having a character-generating utility program, said character-generating utility program defining function prototypes for configuring said remote application connection to said character-generating server, and an application program interface, said application program interface allowing said remote application to query said character-generating server for said character set.

67. The apparatus in claim 66, wherein said character-generating server has a plurality of key-pool groups.

68. The apparatus in claim 66, wherein said key-pool group having a key and a plurality of pools.

69. The apparatus in claim 66, wherein said random generator makes a pseudo random number required by said character generator to select a position on said orbit.

70. The apparatus in claim 66, wherein said pool is a list of mapping positions in said key, said mapping position is marked "used" each time said character-generating server makes a character from said key.

71. The apparatus in claim 66, wherein said character-generating server clears said pool each time said pool is full, or every said tick, whichever comes first.

72. The apparatus in claim 66, wherein both said character-generating server and said remote application are capable of generating at least said pre-set number of groups of said character sets every tick.

73. The apparatus in claim 66, wherein said character-generating server listens on a fixed port for requests from said remote application, said client can be a single remote application or a group of remote applications, and never produces any uninitiated transmissions to said client.

74. The apparatus in claim 66, wherein said character-generating server is capable of generating several different type of character set.

75. A method for generating a group of character sets that are both never repeating within certain period of time and difficult to guess, said method comprising:
    (a) generating a request for said character set by a client of a character-generating server, said character-generating server existing either as a single task in an embedded environment or as a single process daemon in a UNIX environment, said character-generating server comprising a character generator, a random generator connecting to said character generator, a temporal reference storage connecting to said character generator, said temporal reference storage storing the most current time information, and a key-pool group connecting to said character generator, said key-pool group including any or all of a first type of key with a first type of pool, a second type of key with a second type of pool, and a third type of key with a third type of pool;

(b) sending said request by said client to said character-generating server, said character-generating server having an external timer device capable of providing both a current time and a periodic tick of approximately one second to said character-generating server, said client connecting to said character-generating server through a network interface, said network interface connecting to said character generator and capable of providing said character generating-server with access to functions to encode and send out information, and to receive and decode information;

(c) generating a pseudo random number required by said character generator;

(d) sending said pseudo random number to said character generator;

(e) generating a character for said character set, said character set having thirty-two different characters, by said character generator based on a geometric progression of $x(n)=p(x(n-1)+i)$, said geometric progression manifesting itself as a chaotic progression of orbits around an origin, said orbit being defined as a unique and continuous path around said origin and never crossing in on itself or any other orbit, said $x(n)$ and said $x(n-1)$ representing different character set, said n representing the number of said character set generated by said character-generating server, said i representing a temporal difference between the time when two sequential orbits crossing an arbitrary infinite vector from said origin, said p representing a period, said period being the temporal difference between character sets along any of said orbit, said geometric progression defining thirty-two periods on any of said orbit, said character set being a first type of character set, a second type of character set and a third type of character set; and (f) sending said character set by said character-generating server to said client.

76. The method in claim 75 further comprises repeating (c) to (e) until all said characters of said character set have been generated.

77. The method in claim 75, wherein said character generator selects a position on said orbit based on said random number generated by said random generator.

78. The method in claim 75, wherein said first type of pool is a list of first type of mapping positions in said first type of key, said first type of mapping position is marked "used" each time said character-generating server makes a character from said first type of key.

79. The method in claim 75, wherein said second type of pool is a list of second type of mapping positions in said second type of key, said second type of mapping position is marked "used" each time said character-generating server makes a character from said second type of key.

80. The method in claim 75, wherein said third type of pool comprises a double primary pool and a double rotating pool, said third type of key comprises a primary key and a rotating key, said double primary pool is a list of primary mapping positions in said primary key, said double rotating pool is a list of rotating mapping positions in said rotating key, said primary mapping position is marked "used" each time said character-generating server makes a character from said primary key, and said rotating mapping position is marked "used" each time said character-generating server makes a character from said rotating key.

81. The method in claim 75, wherein said character-generating server clears said pool each time said pool is full, or every one second, whichever comes first.

82. The method in claim 75, wherein said character-generating server is capable of generating 1,065,151,889,408 said first type of character set before it repeats a value if all said first type of character sets are requested in a constant stream, actual number of said first type of character set generated before repeating depends on said character-generating server restarts and idle time.

83. The method in claim 75, wherein said character-generating server is capable of generating 1,065,151,899,408 said first type of character sets every one second.

84. The method in claim 75, wherein said character-generating server is capable of generating thirty-two said second type of character sets every one second.

85. The method in claim 75, wherein said character-generating server is capable of generating 1024 said third type of character sets every one second.

86. The method in claim 75, wherein said first type of character set is easier to guess than either said second type of character set or said third type of character set.

87. The method in claim 75, wherein said second type of character set is guaranteed to not repeat for twenty-eight years from the activation of the character-generating server.

88. The method in claim 75, wherein said third type of character set is an extension of a second type of character set in the sense that it will not repeat for twenty-eight years, said third type of character set is simpler to guess than said second type of character set.

89. The method in claim 75, wherein said character-generating server listens on a fixed port for requests from said client, said client can be a single client or a group of clients, and never produces any uninitiated transmissions to said client.

90. A method for generating a group of character sets that are both never repeating within certain period of time and difficult to guess, said method comprising:

(a) generating a request for said character set by a client of a character-generating server, said character-generating server comprising a character generator, a random generator connecting to said character generator, a temporal reference storage connecting to said character generator, said temporal reference storage storing the most current time information, and a key-pool group connecting to said character generator, said key-pool group including any or all of a first type of key with a first type of pool, a second type of key with a second type of pool, and a third type of key with a third type of pool;

(b) sending said request by said client to said character-generating server, said character-generating server having an external timer device capable of providing both a current time and a periodic tick to said character-generating server, time interval between any of two consecutive said periodic ticks being adjustable, said client connecting to said character-generating server through a network interface, said network interface connecting to said character generator and capable of providing said character generating-server with access to functions to encode and send out information, and to receive and decode information;

(c) generating a pseudo random number required by said character generator;

(d) sending said pseudo random number to said character generator;

(e) generating a character for said character set, said character set having a pre-set number of characters, by said character generator based on a geometric progression of x(n)=p(x(n−1)+i), said geometric progression manifesting itself as a chaotic progression of orbits around an origin, said orbit being defined as a unique and continuous path around said origin and never crossing in on itself or any other orbit, said x(n) and said x(n−1) representing different character set, said n representing the number of said character set generated by said character-generating server, said i representing a temporal difference between the time when two sequential orbits crossing an arbitrary infinite vector from said origin, said p representing a period, said period being the temporal difference between character sets along any of said orbit, said geometric progression defining a pre-set number of periods on any of said orbit, said character set being a first type of character set, a second type of character set and a third type of character set; and (f) sending said character set by said character-generating server to said client.

91. The method in claim 90 further comprises repeating (c) to (e) until all said characters of said character set have been generated.

92. The method in claim 90, wherein said character generator selects a position on said orbit based on said random number generated by said random generator.

93. The method in claim 90, wherein said first type of pool is a list of first type of mapping positions in said first type of key, said first type of mapping position is marked "used" each time said character-generating server makes a character from said first type of key.

94. The method in claim 90, wherein said second type of pool is a list of second type of mapping positions in said second type of key, said second type of mapping position is marked "used" each time said character-generating server makes a character from said second type of key.

95. The method in claim 90, wherein said third type of pool comprises a double primary pool and a double rotating pool, said third type of key comprises a primary key and a rotating key, said double primary pool is a list of primary mapping positions in said primary key, said double rotating pool is a list of rotating mapping positions in said rotating key, said primary mapping position is marked "used" each time said character-generating server makes a character from said primary key, and said rotating mapping position is marked "used" each time said character-generating server makes a character from said rotating key.

96. The method in claim 90, wherein said character-generating server clears said pool each time said pool is full, or every said tick, whichever comes first.

97. The method in claim 90, wherein said character-generating server is capable of generating a significant large number of said first type of character sets before it repeats a value if all said first type of character sets are requested in a constant stream, actual number of said first type of character set generated before repeating depends on said character-generating server restarts and idle time.

98. The method in claim 90, wherein said character-generating server is capable of generating a significant large number of said first type of character sets every tick.

99. The method in claim 90, wherein said character-generating server is capable of generating said pre-set number of said second type of character sets every tick.

100. The method in claim 90, wherein said character-generating server is capable of generating a large number of said third type of character sets every tick.

101. The method in claim 90, wherein said first type of character set is easier to guess than either said second type of character set or said third type of character set.

102. The method in claim 90, wherein said second type of character set is guaranteed to not repeat for a certain period of time from the activation of the character-generating server.

103. The method in claim 90, wherein said third type of character set is an extension of a second type of character set in the sense that it will not repeat for a certain period of time, said third type of character set is simpler to guess than said second type of character set.

104. The method in claim 90, wherein said character-generating server listens on a fixed port for requests from said client, said client can be a single client or a group of clients, and never produces any uninitiated transmissions to said client.

105. A method for generating a group of character sets that are both never repeating within certain period of time and difficult to guess, said method comprising:

(a) generating a request for said character set by a client of a character-generating server, said character-generating server comprising a character generator, a random generator connecting to said character generator, a temporal reference storage connecting to said character generator, said temporal reference storage storing the most current time information, and a key-pool group, said key-pool group having a key and a pool, connecting to said character generator;

(b) sending said request by said client to said character-generating server, said character-generating server having an external timer device capable of providing both a current time and a periodic tick to said character-generating server, time interval between any of two consecutive said periodic ticks being adjustable, said client connecting to said character-generating server through a network interface, said network interface connecting to said character generator and capable of providing said character generating-server with access to functions to encode and send out information, and to receive and decode information;

(c) generating a pseudo random number required by said character generator;

(d) sending said pseudo random number to said character generator;

(e) generating a character for said character set, said character set having a pre-set number of characters, by said character generator based on a geometric progression of x(n)=p(x(n−1)+i), said geometric progression manifesting itself as a chaotic progression of orbits around an origin, said orbit being defined as a unique and continuous path around said origin and never crossing in on itself or any other orbit, said x(n) and said x(n−1) representing different character set, said n representing the number of said character set generated by said character-generating server, said i representing a temporal difference between the time when two sequential orbits crossing an arbitrary infinite vector from said origin, said p representing a period, said period being the temporal difference between character sets along any of said orbit, said geometric progression defining said pre-set number of periods on any of said orbit; and (f) sending said character set by said character-generating server to said client.

106. The method in claim 105 further comprises repeating (c) to (e) until all said characters of said character set have been generated.

107. The method in claim 105, wherein said character generator selects a position on said orbit based on said random number generated by said random generator.

108. The method in claim 105, wherein said pool is a list of mapping positions in said key, said mapping position is marked "used" each time said character-generating server makes a character from said key.

109. The method in claim 105, wherein said character-generating server is capable of generating several different type of character set.

110. The method in claim 105, wherein said character-generating server has a plurality of key-pool groups.

111. The method in claim 105, wherein said key-pool group has a key and a plurality of pools.

112. The method in claim 105, wherein said character-generating server clears said pool each time said pool is full, or every said tick, whichever comes first.

113. The method in claim 105, wherein said character-generating server is capable of generating at least said pre-set number of said character sets every tick.

114. The method in claim 105, wherein said character-generating server listens on a fixed port for requests from said client, said client can be a single client or a group of unrelated clients, and never produces any uninitiated transmissions to said client.

115. A method for generating a group of character sets that are both never repeating within certain period of time and difficult to guess, said method comprising:

(a) generating a request for said character set by a client of a character-generating server, said character-generating server existing either as a single task in an embedded environment or as a single process daemon in a UNIX environment, said character-generating server comprising a character generator, a random generator connecting to said character generator, a temporal reference storage connecting to said character generator, said temporal reference storage storing the most current time information, and a key-pool group connecting to said character generator, said key-pool group including any or all of a first type of key with a first type of pool, a second type of key with a second type of pool, and a third type of key with a third type of pool;

(b) sending said request by said client to said character-generating server, said character-generating server having an external timer device capable of providing both a current time and a periodic tick of approximately one second to said character-generating server, said client connecting to said character-generating server through a network interface, said network interface connecting to said character generator and capable of providing said character generating-server with access to functions to encode and send out information, and to receive and decode information;

(c) generating a pseudo random number required by said character generator;

(d) sending said pseudo random number to said character generator;

(e) generating a character for said character set, said character set having thirty-two different characters, by said character generator based on a geometric progression of $x(n)=p(x(n-1)+i)$, said geometric progression manifesting itself as a chaotic progression of orbits around an origin, said orbit being defined as a unique and continuous path around said origin and never crossing in on itself or any other orbit, said $x(n)$ and said $x(n-1)$ representing different character set, said n representing the number of said character set generated by said character-generating server, said i representing a temporal difference between the time when two sequential orbits crossing an arbitrary infinite vector from said origin, said p representing a period, said period being the temporal difference between character sets along any of said orbit, said geometric progression defining thirty-two periods on any of said orbit, said character set being a first type of character set, a second type of character set and a third type of character set; and (f) sending said character set along with a related key by said character-generating server to said client;

(g) sending said character set along with said related key to a target server, said target server connecting to said character-generating server through said network interface, said target server having a character-generating utility program, said character-generating utility program defines function prototypes for configuring said target server connection to said character-generating server, and an application program interface, said application program interface allows said target server to query said character-generating server for said first type of character set, said second type of character set or said third type of character set;

(h) sending said related key to said character-generating server by said target server;

(i) re-creating said character set from said related key by said target server; and (j) sending said character set along with said related key to said target server.

116. The method in claim 115 further comprises repeating (c) to (e) until all said characters of said character set have been generated.

117. The method in claim 115, wherein said character generator selects a position on said orbit based on said random number generated by said random generator.

118. The method in claim 115, wherein said first type of pool is a list of first type of mapping positions in said first type of key, said first type of mapping position is marked "used" each time said character-generating server makes a character from said first type of key.

119. The method in claim 115, wherein said second type of pool is a list of second type of mapping positions in said second type of key, said second type of mapping position is marked "used" each time said character-generating server makes a character from said second type of key.

120. The method in claim 115, wherein said third type of pool comprises a double primary pool and a double rotating pool, said third type of key comprises a primary key and a rotating key, said double primary pool is a list of primary mapping positions in said primary key, said double rotating pool is a list of rotating mapping positions in said rotating key, said primary mapping position is marked "used" each time said character-generating server makes a character from said primary key, and said rotating mapping position is marked "used" each time said character-generating server makes a character from said rotating key.

121. The method in claim 115, wherein said character-generating server clears said pool each time said pool is full, or every one second, whichever comes first.

122. The method in claim 115, wherein both said character-generating server and said target server are capable of generating 1,065,151,889,408 said first type of character set before it repeats a value if all said first type of character sets are requested in a constant stream, actual number of said first type of character set generated before repeating depends on said character-generating server restarts and idle time.

123. The method in claim 115, wherein both said character-generating server and said target server are capable of generating 1,065,151,899,408 said first type of character sets every one second.

124. The method in claim 115, wherein both said character-generating server and said target server are capable of generating thirty-two said second type of character sets every one second.

125. The method in claim 115, wherein both said character-generating server and said target server is capable of generating 1024 said third type of character sets every one second.

126. The method in claim 115, wherein said first type of character set is easier to guess than either said second type of character set or said third type of character set.

127. The method in claim 115, wherein said second type of character set is guaranteed to not repeat for twenty-eight years from the activation of the character-generating server.

128. The method in claim 115, wherein said third type of character set is an extension of a second type of character set in the sense that it will not repeat for twenty-eight years, said third type of character set is simpler to guess than said second type of character set.

129. The method in claim 115, wherein said character-generating server listens on a fixed port for requests from said client, said client can be a single client or a group of clients, and never produces any uninitiated transmissions to said client.

130. A method for generating a group of character sets that are both never repeating within certain period of time and difficult to guess, said method comprising:
   (a) generating a request for said character set by a client of a character-generating server, said character-generating server comprising a character generator, a random generator connecting to said character generator, a temporal reference storage connecting to said character generator, said temporal reference storage stores the most current time information, and a key-pool group connecting to said character generator, said key-pool group includes any or all of a first type of key with a first type of pool, a second type of key with a second type of pool, and a third type of key with a third type of pool;
   (b) sending said request by said client to said character-generating server, said character-generating server having an external timer device capable of providing both a current time and a periodic tick to said character-generating server, time interval between any of two consecutive said periodic ticks being adjustable, said client connecting to said character-generating server through a network interface, said network interface connecting to said character generator and capable of providing said character generating-server with access to functions to encode and send out information, and to receive and decode information;
   (c) generating a pseudo random number required by said character generator;
   (d) sending said pseudo random number to said character generator;
   (e) generating a character for said character set, said character set having a pre-set number of characters, by said character generator based on a geometric progression of $x(n)=p(x(n-1)+i)$, said geometric progression manifests itself as a chaotic progression of orbits around an origin, said orbit is defined as a unique and continuous path around said origin that never crosses in on itself or any other orbit, said $x(n)$ and said $x(n-1)$ represent different character set, said n represents the number of said character set generated by said character-generating server, said i represents a temporal difference between the time when two sequential orbits cross an arbitrary infinite vector from said origin, said p represents a period, said period is the temporal difference between character sets along any of said orbit, said geometric progression defines a pre-set number of periods on any of said orbit, said character set can be a first type of character set, a second type of character set and a third type of character set; an
   (f) sending said character set along with a related key by said character-generating server to said client;
   (g) sending said character set along with said related key to a target server, said target server connecting to said character-generating server through said network interface, said target server having a character-generating utility program, said character-generating utility program defining function prototypes for configuring said target server connection to said character-generating server, and an application program interface, said application program interface allowing said target server to query said character-generating server for said first type of character set, said second type of character set or said third type of character set;
   (h) sending said related key to said character-generating server by said target server;
   (i) re-creating said character set from said related key by said target server; and
   (j) sending said character set along with said related key to said target server.

131. The method in claim 130 further comprises repeating (c) to (e) until all said characters of said character set have been generated.

132. The method in claim 130, wherein said character generator selects a position on said orbit based on said random number generated by said random generator.

133. The method in claim 130, wherein said first type of pool is a list of first type of mapping positions in said first type of key, said first type of mapping position is marked "used" each time said character-generating server makes a character from said first type of key.

134. The method in claim 130, wherein said second type of pool is a list of second type of mapping positions in said second type of key, said second type of mapping position is marked "used" each time said character-generating server makes a character from said second type of key.

135. The method in claim 130, wherein said third type of pool comprises a double primary pool and a double rotating pool, said third type of key comprises a primary key and a rotating key, said double primary pool is a list of primary mapping positions in said primary key, said double rotating pool is a list of rotating mapping positions in said rotating key, said primary mapping position is marked "used" each time said character-generating server makes a character from said primary key, and said rotating mapping position is marked "used" each time said character-generating server makes a character from said rotating key.

136. The method in claim 130, wherein said character-generating server clears said pool each time said pool is full, or every said tick, whichever comes first.

137. The method in claim 130, wherein both said character-generating server and said target server are capable of generating a significant large number of said first type of character sets before it repeats a value if all said first type of character sets are requested in a constant stream, actual number of said first type of character set generated before repeating depends on said character-generating server restarts and idle time.

138. The method in claim 130, wherein both said character-generating server and said target server are capable of generating a significant large number of said first type of character sets every tick.

139. The method in claim 130, wherein both said character-generating server and said target server are capable of generating said pre-set number of said second type of character sets every tick.

140. The method in claim 130, wherein both said character-generating server and said target server are capable of generating a large number of said third type of character sets every tick.

141. The method in claim 130, wherein said first type of character set is easier to guess than either said second type of character set or said third type of character set.

142. The method in claim 130, wherein said second type of character set is guaranteed to not repeat for a certain period of time from the activation of the character-generating server.

143. The method in claim 130, wherein said third type of character set is an extension of a second type of character set in the sense that it will not repeat for a certain period of time, said third type of character set is simpler to guess than said second type of character set.

144. The method in claim 130, wherein said character-generating server listens on a fixed port for requests from said client, said client can be a single client or a group of unrelated clients, and never produces any uninitiated transmissions to said client.

145. A method for generating a group of character sets that are both never repeating within certain period of time and difficult to guess, said method comprising:
(a) generating a request for said character set by a client of a character-generating server, said character-generating server comprising a character generator, a random generator connecting to said character generator, a temporal reference storage connecting to said character generator, said temporal reference storage storing the most current time information, and a key-pool group, said key-pool group having a key and a pool, connecting to said character generator;
(b) sending said request by said client to said character-generating server, said character-generating server having an external timer device capable of providing both a current time and a periodic tick to said character-generating server, time interval between any of two consecutive said periodic ticks being adjustable, said client connecting to said character-generating server through a network interface, said network interface connecting to said character generator and capable of providing said character generating-server with access to functions to encode and send out information, and to receive and decode information;
(c) generating a pseudo random number required by said character generator;
(d) sending said pseudo random number to said character generator;
(e) generating a character for said character set, said character set having a pre-set number of characters, by said character generator based on a geometric progression of $x(n)=p(x(n-1)+i)$, said geometric progression manifesting itself as a chaotic progression of orbits around an origin, said orbit being defined as a unique and continuous path around said origin and never crossing in on itself or any other orbit, said $x(n)$ and said $x(n-1)$ representing different character set, said n representing the number of said character set generated by said character-generating server, said i representing a temporal difference between the time when two sequential orbits crossing an arbitrary infinite vector from said origin, said p representing a period, said period being the temporal difference between character sets along any of said orbit, said geometric progression defining said pre-set number of periods on any of said orbit;
(f) sending said character set along with a related key by said character-generating server to said client;
(g) sending said character set along with said related key to a target server, said target server connecting to said character-generating server through said network interface, said target server having a character-generating utility program, said character-generating utility program defining function prototypes for configuring said target server connection to said character-generating server, and an application program interface, said application program interface allowing said target server to query said character-generating server for said character set;
(h) sending said related key to said character-generating server by said target server;
(i) re-creating said character set from said related key by said target server; and
(j) sending said character set along with said related key to said target server.

146. The method in claim 145 further comprises repeating (c) to (e) until all said characters of said character set have been generated.

147. The method in claim 145, wherein said character generator selects a position on said orbit based on said random number generated by said random generator.

148. The method in claim 145, wherein said pool is a list of mapping positions in said key, said mapping position is marked "used" each time said character-generating server makes a character from said key.

149. The method in claim 145, wherein both said character-generating server and said target server are capable of generating several different type of character set.

150. The method in claim 145, wherein said character-generating server has a plurality of key-pool groups.

151. The method in claim 145, wherein said key-pool group has a key and a plurality of pools.

152. The method in claim 145, wherein said character-generating server clears said pool each time said pool is full, or every said tick, whichever comes first.

153. The method in claim 145, wherein said character-generating server is capable of generating at least said pre-set number of said character sets every tick.

154. The method in claim 145, wherein said character-generating server listens on a fixed port for requests from said client, said client can be a single client or a group of unrelated clients, and never produces any uninitiated transmissions to said client.

155. An apparatus for generating a group of character sets that are both never repeating within certain period of time and difficult to guess, said apparatus comprising:

a character-generating server, said character-generating server comprising a character generator, a random generator connecting to said character generator, a temporal reference storage connecting to said character generator, and a key-pool group, said key-pool group having a key and a pool, connecting to said character generator, said character-generating server being capable of generating a character set, said character set having a pre-set number of different characters, the character set being defined by a geometric progression of $x(n)=p(x(n-1)+i)$, said geometric progression manifesting itself as a chaotic progression of orbits around an origin, said orbit being defined as a unique, continuous path around said origin and never crossing in on itself or any other orbit, said $x(n)$ and said $x(n-1)$ representing different character sets, said n representing the number of said character set generated by said character-generating server, said i representing a temporal difference between the time when two sequential orbits crossing an arbitrary infinite vector from said origin, said p representing a period, said period being the temporal difference between character sets along an orbit, said geometric progression defining said pre-set number of periods per orbit;

a network interface, said network interface connecting to said character generator; and an external timer device, said external timer device connecting to said character-generating server.

156. An apparatus for generating a group of character sets that are both never repeating within certain period of time and difficult to guess, said apparatus comprising:

a character-generating server, said character-generating server comprising a character generator, a random generator connecting to said character generator, a temporal reference storage connecting to said character generator, and a key-pool group, said key-pool group having a key and a pool, connecting to said character generator, said character-generating server capable of generating a character sets, said character set having a pre-set number of different characters, said character set being defined by a geometric progression of $x(n)=p(x(n-1)+i)$, said geometric progression manifesting itself as a chaotic progression of orbits around an origin, said orbit being defined as a unique, continuous path around said origin and never crossing in on itself or any other orbit, said $x(n)$ and said $x(n-1)$ representing different character sets, said n representing the number of said character set generated by said character-generating server, said i representing a temporal difference between the time when two sequential orbits crossing an arbitrary infinite vector from said origin, said p representing a period, said period being the temporal difference between character sets along an orbit, said geometric progression defining said pre-set number of periods per orbit;

a network interface, said network interface connecting to said character generator;

an external timer device, said external timer device connecting to said character-generating server; and a remote application, said remote application connecting to said character-generating server through said network interface, said remote application having a character-generating utility program, said character-generating utility program defining function prototypes for configuring said remote application connection to said character-generating server, and an application program interface, said application program interface allows said remote application to query said character-generating server for said character set.

157. A method for generating a group of character sets that are both never repeating within certain period of time and difficult to guess, said method comprising:

(a) generating a request for said character set by a client of a character-generating server, said character-generating server comprising a character generator, a random generator connecting to said character generator, a temporal reference storage connecting to said character generator, and a key-pool group, said temporal reference storage storing the most current time information, said key-pool group having a key and a pool, connecting to said character generator, said character-generating server being capable of generating a character set, said character set having a pre-set number of different characters;

(b) sending said request by said client to said character-generating server, said character-generating server having an external timer device, said external timer device connecting to said character-generating server, said client connecting to said character-generating server through a network interface, said network interface connecting to said character generator;

(c) generating a pseudo random number required by said character generator;

(d) sending said pseudo random number to said character generator;

(e) generating a character for said character set by said character generator; and (f) sending said character set by said character-generating server to said client.

158. A method for generating a group of character sets that are both never repeating within certain period of time and difficult to guess, said method comprising:

(a) generating a request for said character set by a client of a character-generating server, said character-generating server comprising a character generator, a random generator connecting to said character generator, a temporal reference storage connecting to said character generator, and a key-pool group, said temporal reference storage storing the most current time information, said key-pool group having a key and a pool, connecting to said character generator, said character-generating server capable of generating a character set, said character set having a pre-set number of different characters;

(b) sending said request by said client to said character-generating server, said character-generating server having an external timer device, said external timer device connecting to said character-generating sewer, said client connecting to said character-generating server through a network interface, said network interface connecting to said character generator;

(c) generating a pseudo random number required by said character generator;

(d) sending said pseudo random number to said character generator;

(e) generating a character for said character set by said character generator;

(f) sending said character set along with a related key by said character-generating sewer to said client;

(g) sending said character set along with said related key to a target server, said target server connecting to said character-generating sewer through said network interface, said target server having a character-generating utility program, said character-generating utility program defining function prototypes for configuring said target server connection to said character-generating server, and an application program interface, said application program interface allowing said target server to query said character-generating server for said character set;

(h) sending said related key to said character-generating server by said target server;

(i) re-creating said character set from said related key by said target server; and (j) sending said character set along with said related key to said target server.

* * * * *